Figure 1:
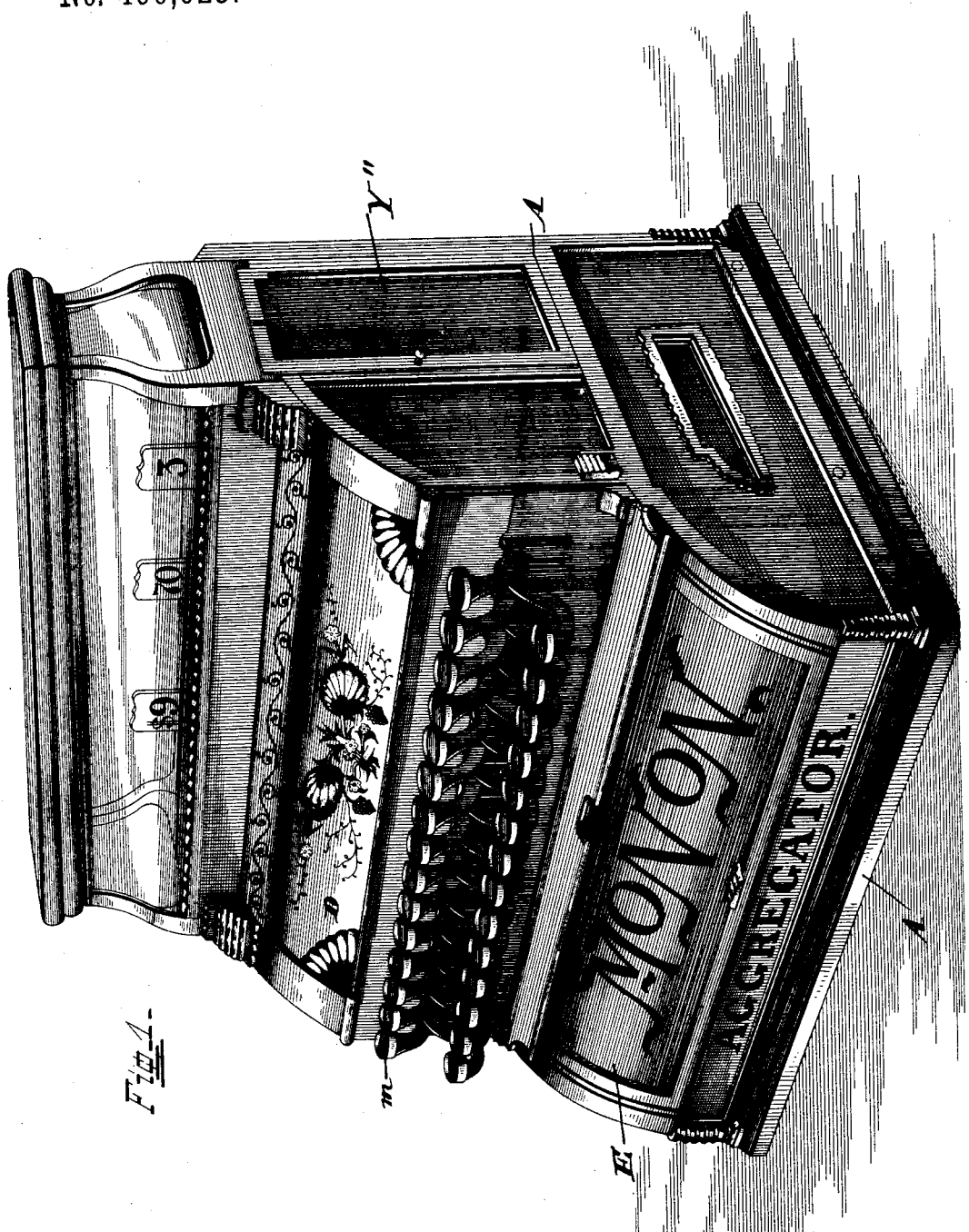

(No Model.) 15 Sheets—Sheet 1.
P. YOE.
CASH INDICATOR, REGISTER AND RECORDER.

No. 460,623. Patented Oct. 6, 1891.

(No Model.) 15 Sheets—Sheet 2.
P. YOE.
CASH INDICATOR, REGISTER AND RECORDER.
No. 460,623. Patented Oct. 6, 1891.

Witnesses
Theo. Kemper
George Heidman

Inventor
Philip Yoe
by Alfred M. Allen
Asso. Attorney.

(No Model.) 15 Sheets—Sheet 7.

P. YOE.
CASH INDICATOR, REGISTER AND RECORDER.

No. 460,623. Patented Oct. 6, 1891.

(No Model.) 15 Sheets—Sheet 8.
P. YOE.
CASH INDICATOR, REGISTER AND RECORDER.
No. 460,623. Patented Oct. 6, 1891.
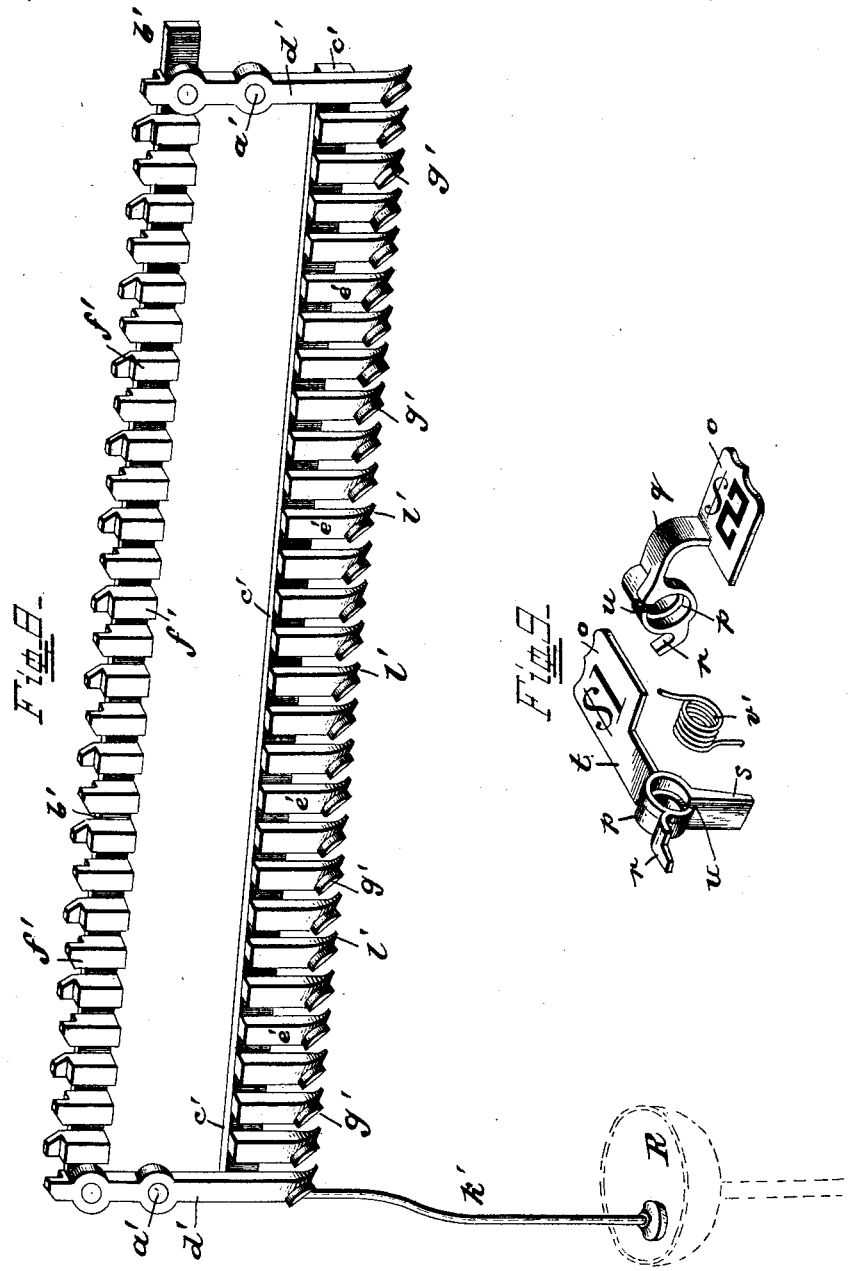
Witnesses
Theo. Kemper
George Stridman
Inventor
Philip Yoe
by Alfred M. Allen
Assoc., Attorney

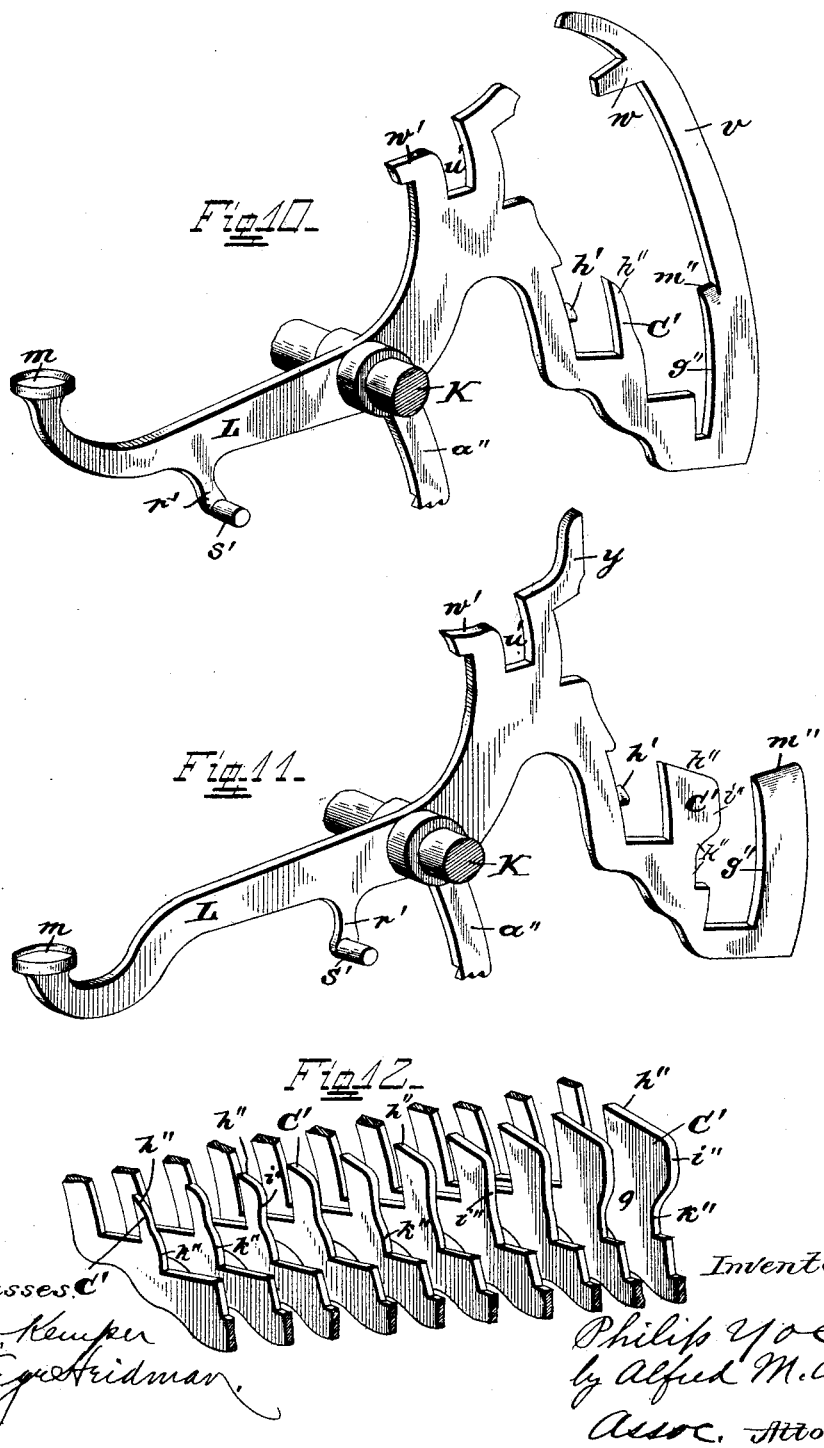

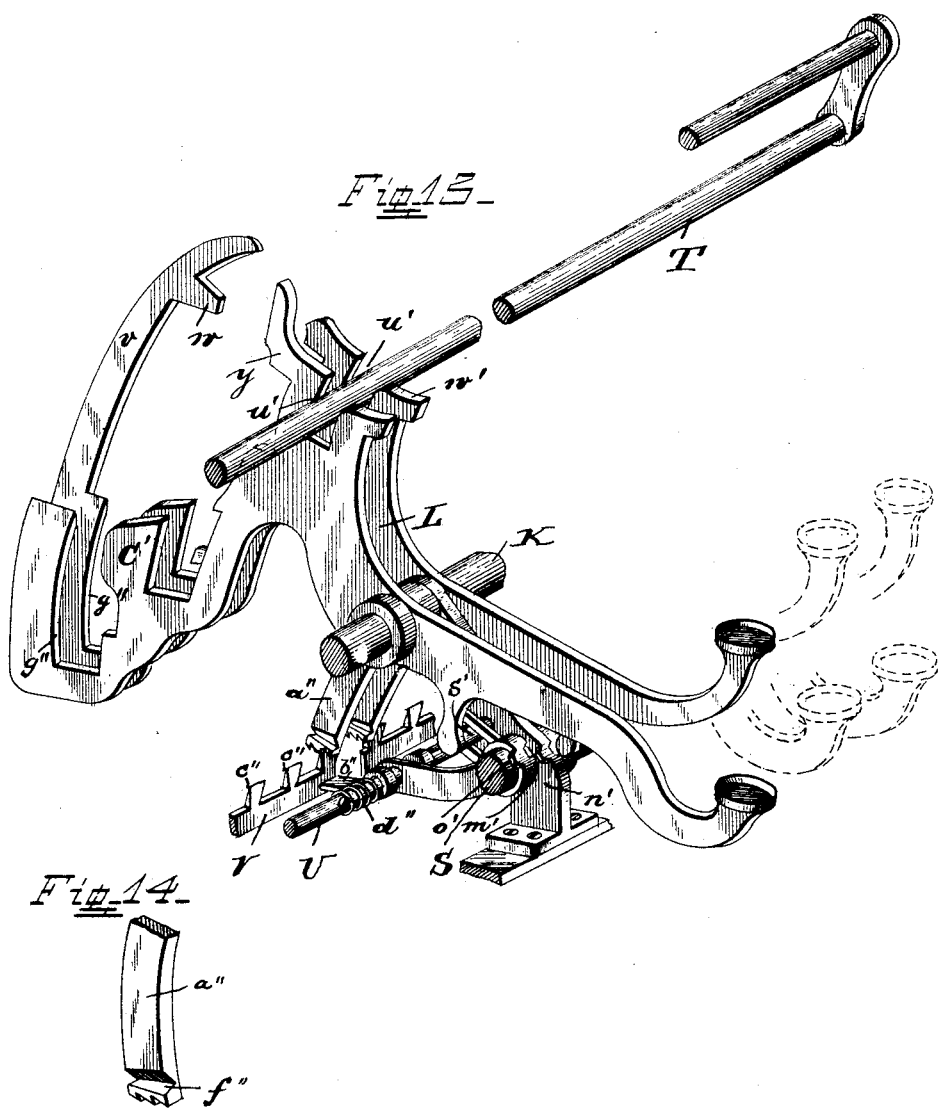

(No Model.) 15 Sheets—Sheet 11.
P. YOE.
CASH INDICATOR, REGISTER AND RECORDER.
No. 460,623. Patented Oct. 6, 1891.
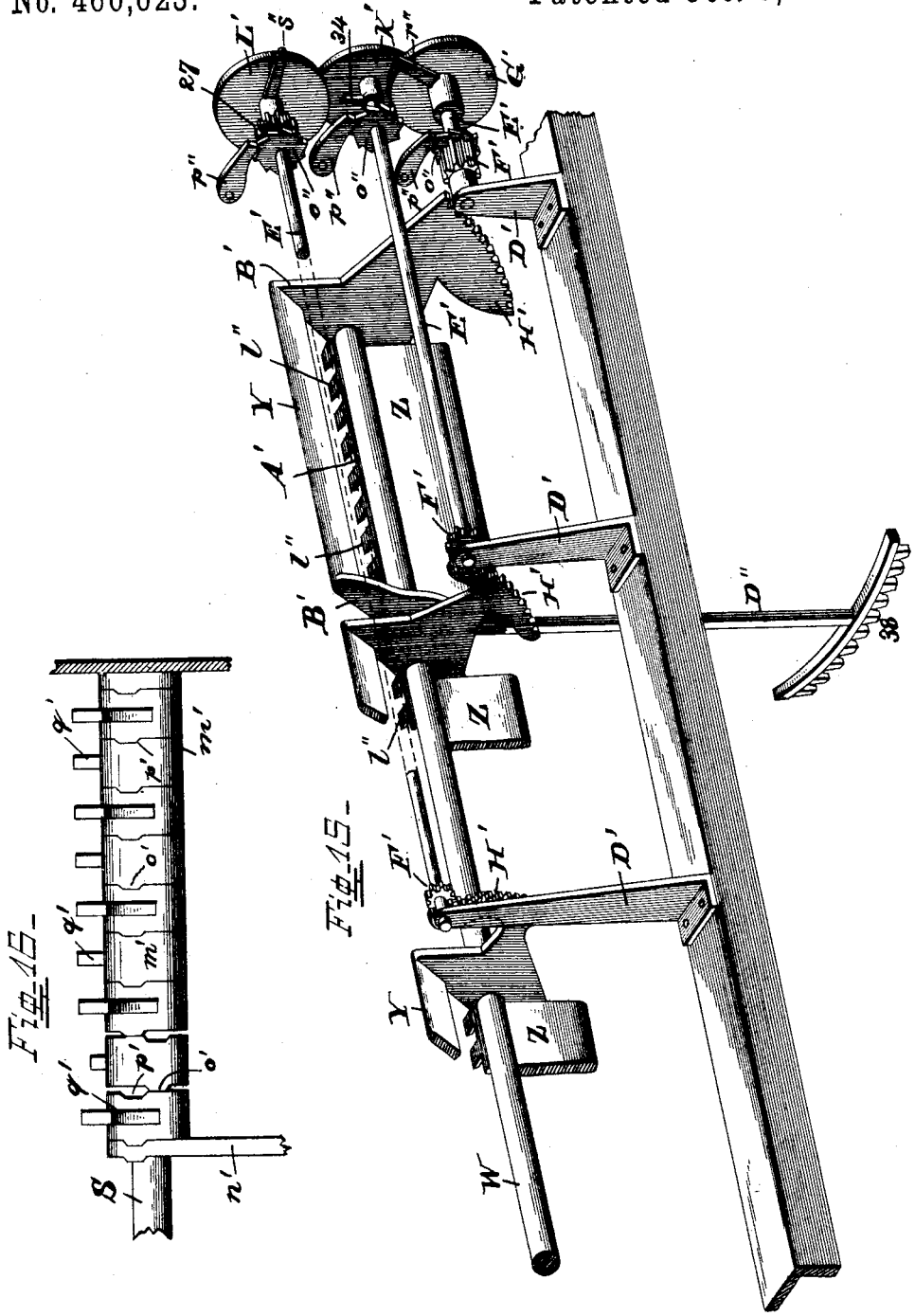

(No Model.) 15 Sheets—Sheet 12.
P. YOE.
CASH INDICATOR, REGISTER AND RECORDER.
No. 460,623. Patented Oct. 6, 1891.
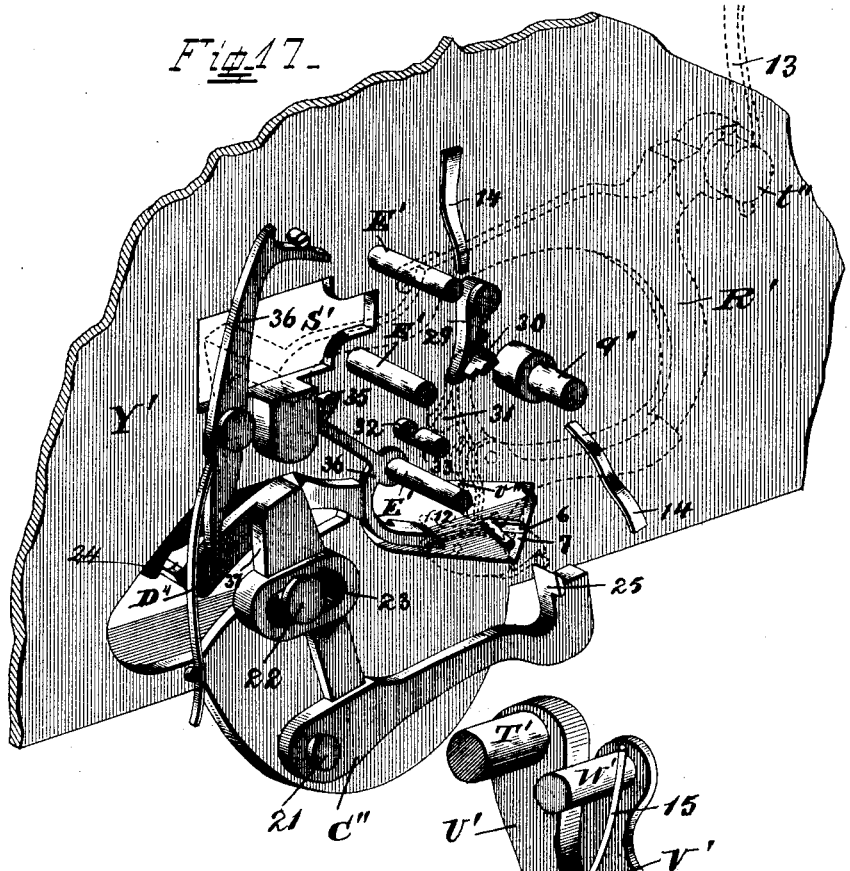
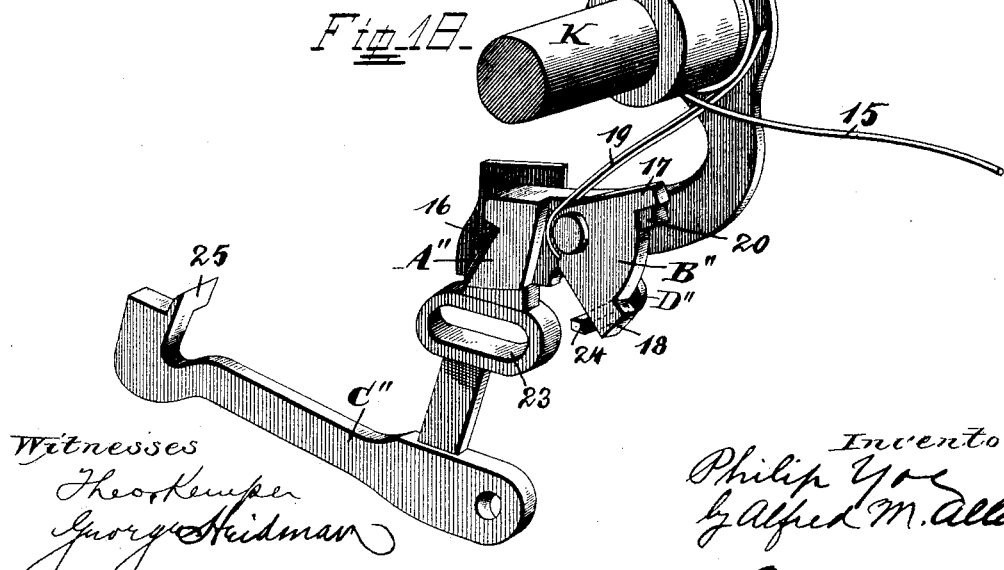

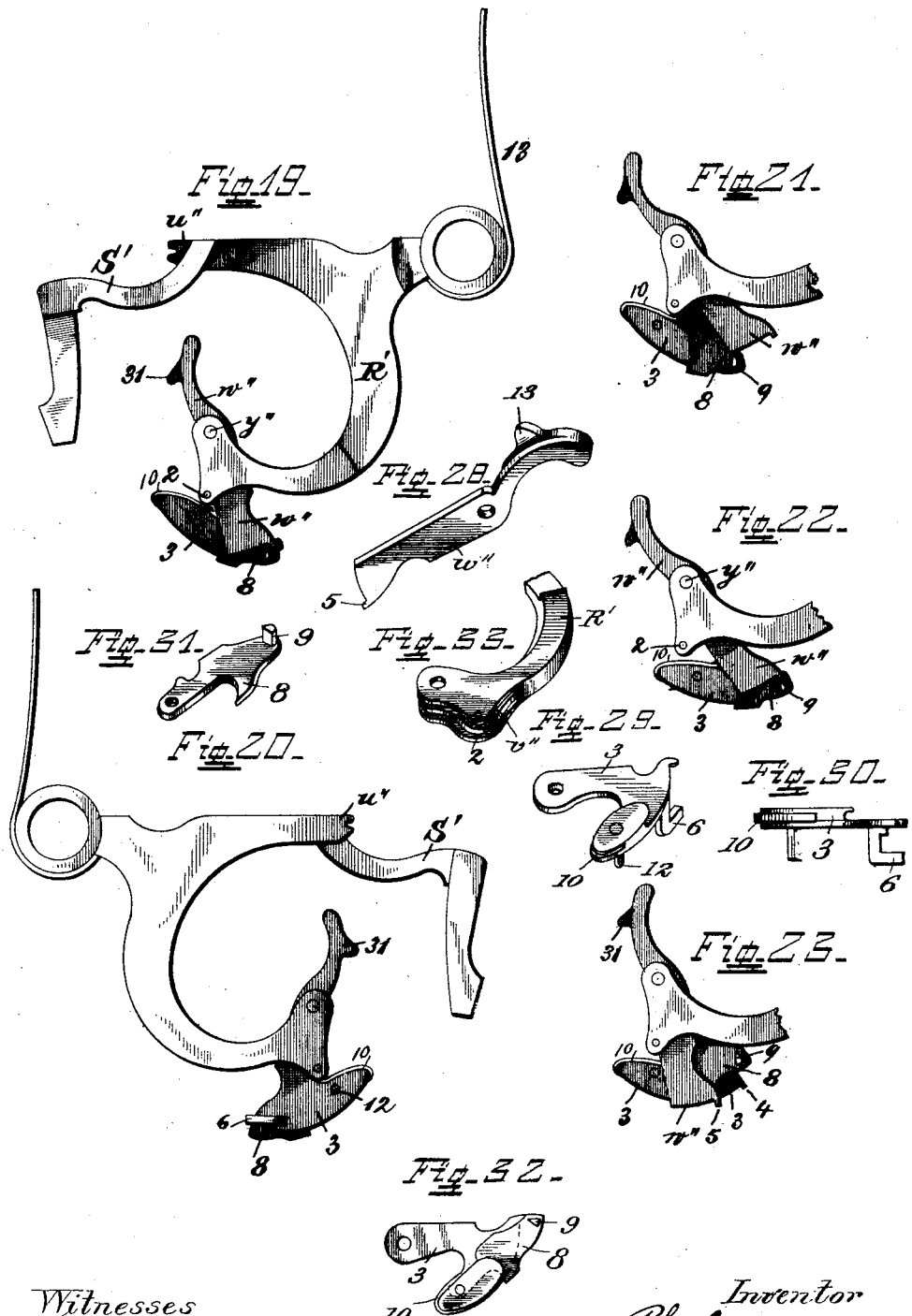

(No Model.) 15 Sheets—Sheet 14.
P. YOE.
CASH INDICATOR, REGISTER AND RECORDER.
No. 460,623. Patented Oct. 6, 1891.
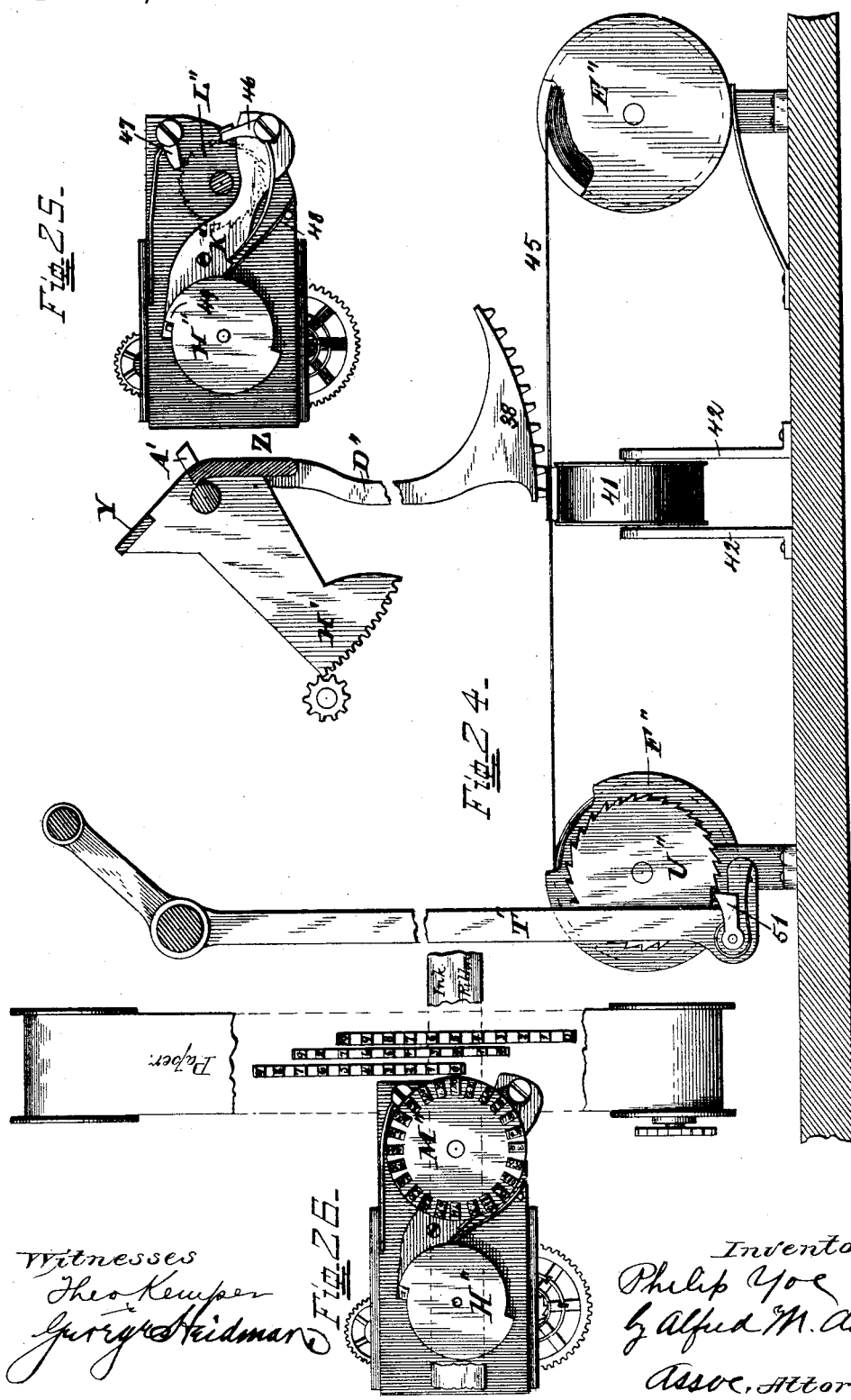

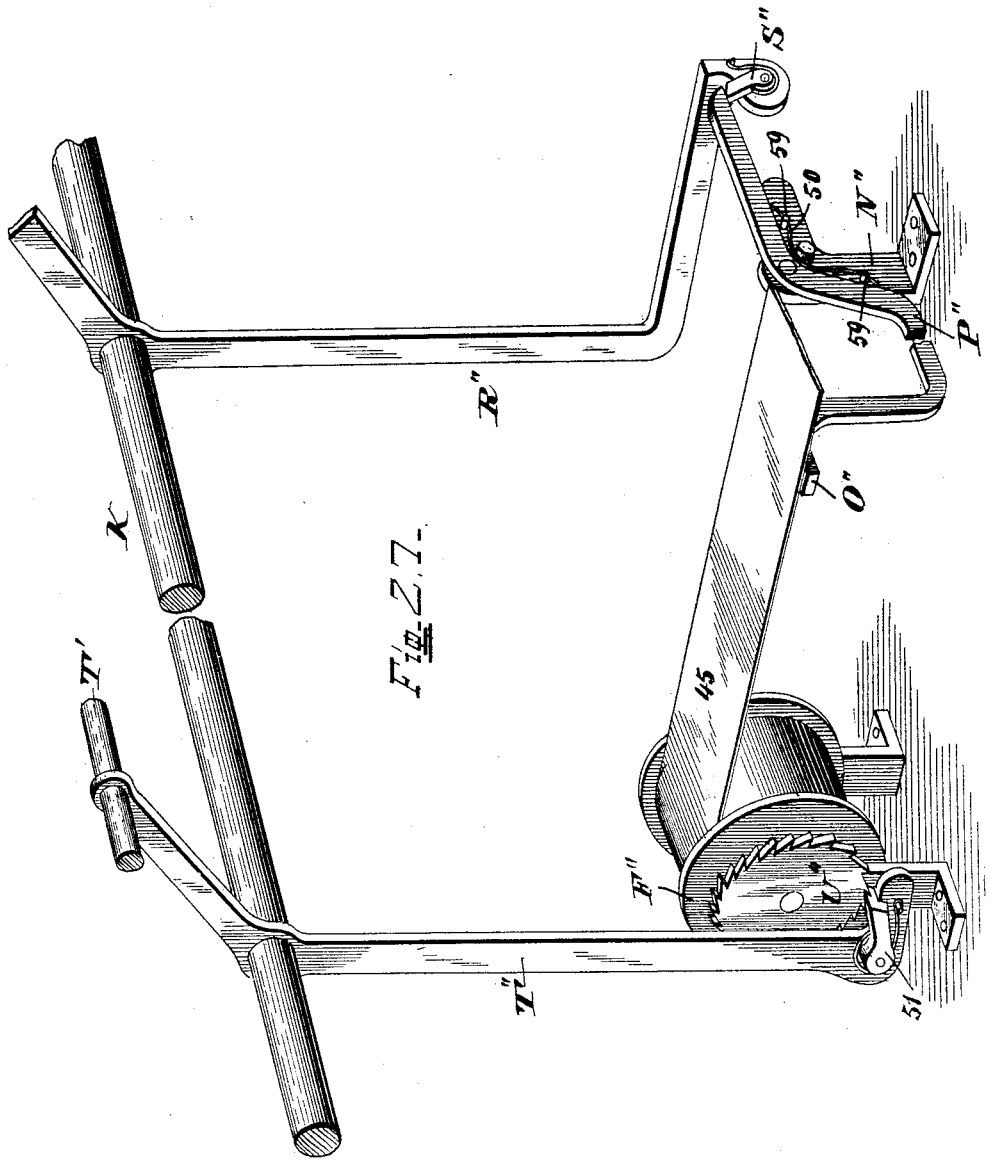

UNITED STATES PATENT OFFICE.

PHILIP YOE, OF DAYTON, OHIO, ASSIGNOR TO THE DAYTON AUTOGRAPHIC REGISTER COMPANY, OF SAME PLACE.

CASH INDICATOR, REGISTER, AND RECORDER.

SPECIFICATION forming part of Letters Patent No. 460,623, dated October 6, 1891.

Application filed March 12, 1891. Serial No. 384,768. (No model.)

*To all whom it may concern:*

Be it known that I, PHILIP YOE, a citizen of the United States, residing at Dayton, county of Montgomery, and State of Ohio, have invented certain new and useful Improvements in Cash Registers, Indicators, and Recorders, of which the following is a full, clear, and exact description, reference being had to the accompanying drawings, forming part of this specification.

My invention relates to improvements in cash registers and indicators for the use of shop-keepers and the like, in which a series of operating-keys are employed in connection with indicating, registering, and recording mechanisms, to indicate, register, and record the various sums of money placed therein.

It has for its object various improvements in the construction of machines of this character, the novelty of which will be hereinafter more particularly pointed out and claimed.

My machine in its entirety belongs to that class of cash registers and indicators in which a series of operating-keys are employed, in connection with a series of numbered tablets, to indicate the amounts deposited in the register, recording mechanism to record the same, and registering mechanism to register and add into a total sum those various amounts, a class of machines that have become well known in the art as "total-adding" machines, as distinguished from "detail-adding machines" in which the registering mechanism is not arranged to totalize the various amounts, although in each class a single registering-wheel is arranged to be actuated to different degrees by each of a group of keys through the medium of an actuator common to the group, and thus to register on a single wheel the various values of the keys of the group; but, although my machine is a total-adding machine, it will be understood that very many of the improvements hereinafter set forth are applicable as well to cash-registering machines belonging to other classes.

It has been my aim to cheapen the construction, simplify the mechanism, and increase the effectiveness and reliability of machines of this character—a problem difficult because of its limitations. Efforts to cheapen the construction and simplify the mechanism are very apt to decrease the effectiveness of the machine, while in the endeavor to increase the reliability the mechanism generally becomes so complicated as to be unfit for practical use.

Cash-registers as a rule receive very hard treatment, especially in the hands of those who would use them dishonestly, and they must be so constructed that, while perfectly reliable and accurate in their work, they cannot be tampered with or caused to register or indicate false amounts by improper usage. The practical success of a cash-register, especially of the total-adding class, depends in a large measure on the absolute accuracy of the registering and adding mechanism, and at the same time its ability to withstand the twists and strains put upon it by the dishonest employé in his endeavor to "beat" the machine. The problem would be comparatively simple were the machine designed for honest proper use only, for delicate nicely-adjusted mechanism—such as is used in the calculating and adding machines—could then be readily employed; but delicate nice adjustment of parts will not be practicable in a cash-register, because such mechanism will not stand rough or improper usage. In cash-registers of this class as ordinarily constructed it is almost always possible by quick movements or strong pressure on the keys at the proper moment to cause the registering mechanism to register falsely. To overcome these difficulties by an accumulation of dogs and pawls and racks and the like is not a proper mechanical solution, because the accumulation of parts adds to the complication of the machinery, decreases its reliability, and increases the work to be performed by the operating-keys to such a degree that they become very difficult to use and the machine fails of practical success. It also fails of practical success in its manufacture, for complication and nice adjustment of parts increase the cost of construction both in the production of the various parts and in their fitting and adjustment into a finished machine.

My aim has been, while accomplishing all that has been accomplished by machines hitherto on the market, to dispense with many useless and unnecessary parts by making the necessary parts perform various functions to do away with the nice adjustment thereof and establish the uniformity of the same, so that castings may be used principally throughout the machine, and the fitting together of the mechanism may be readily accomplished with little skill, and, lastly, so to design and construct the parts that the least amount of power is lost in the operation of the keys, and so that the mechanism can be readily operated with the expenditure of but little force. It is on these various lines that the novelty and valuable features of my machine lie.

Figure 2:
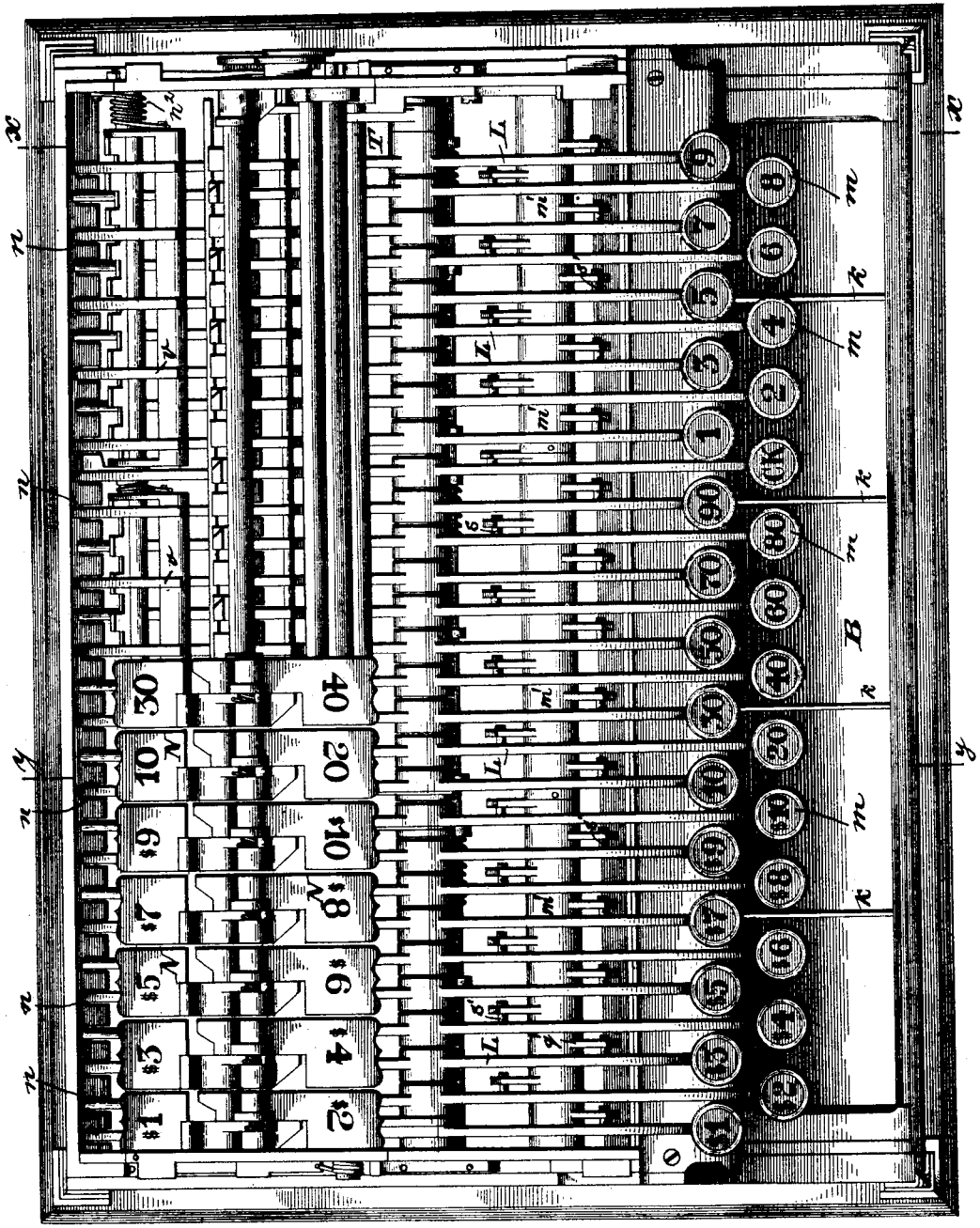
Figure 3:
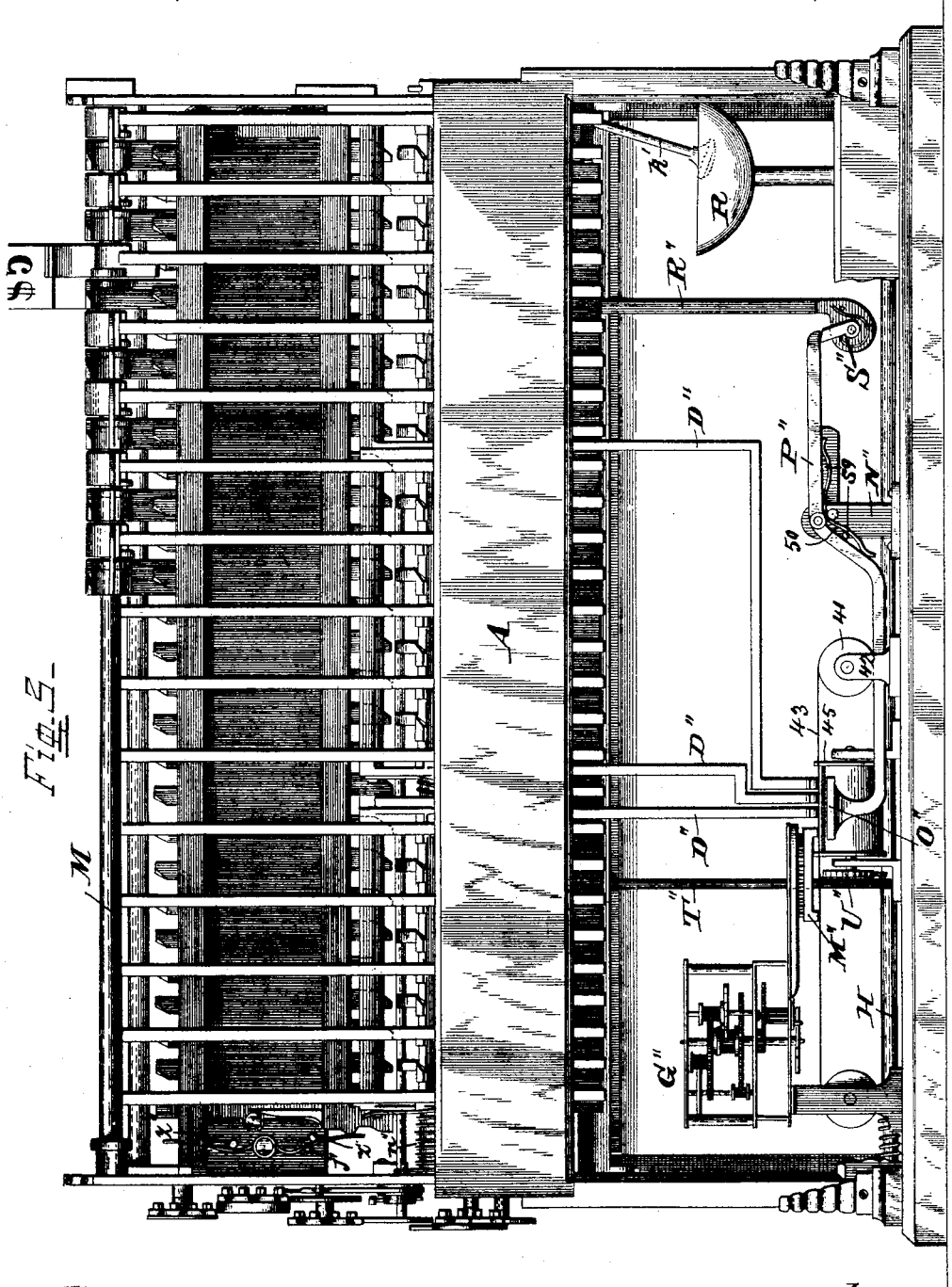
Figure 4:
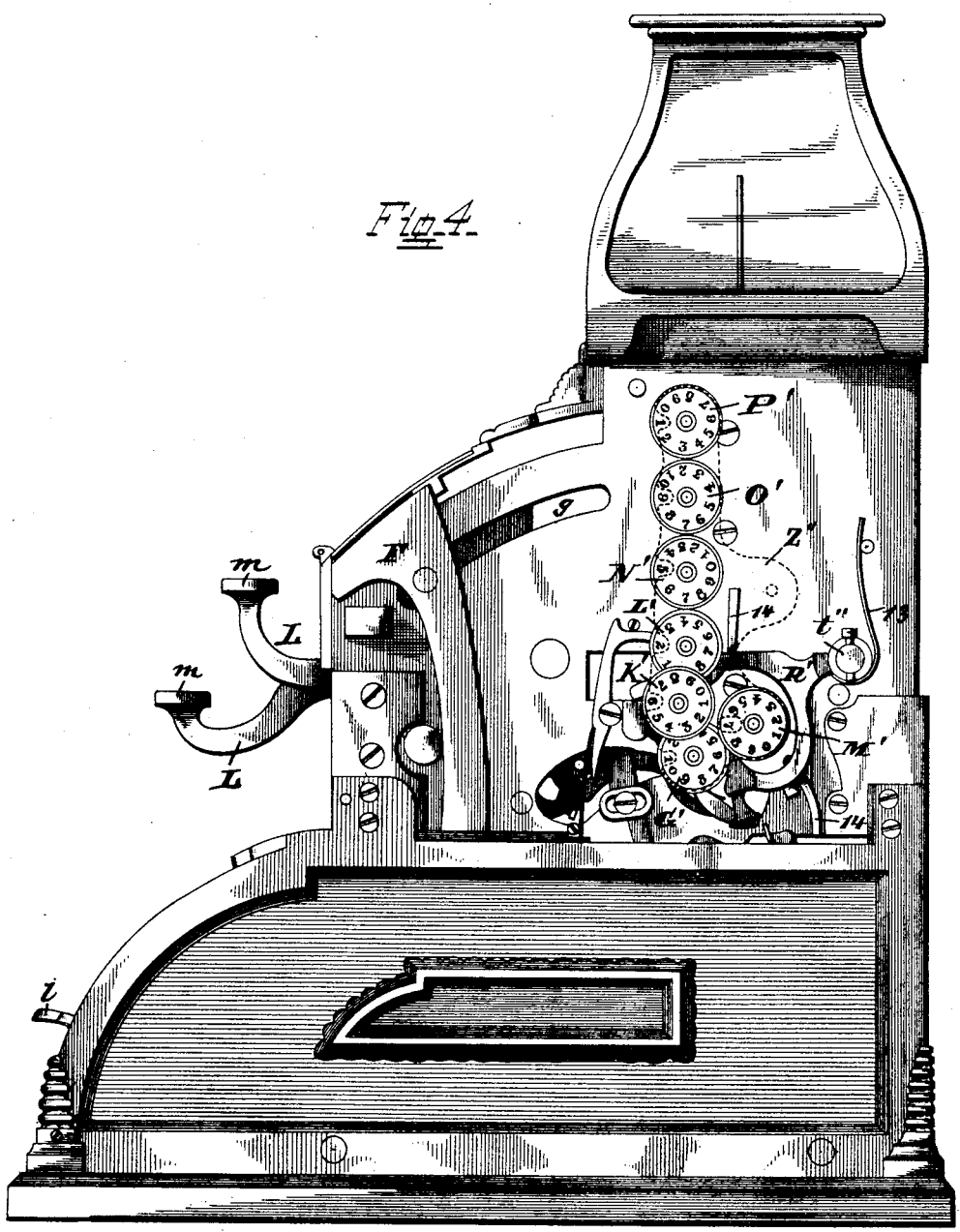
Figure 5:
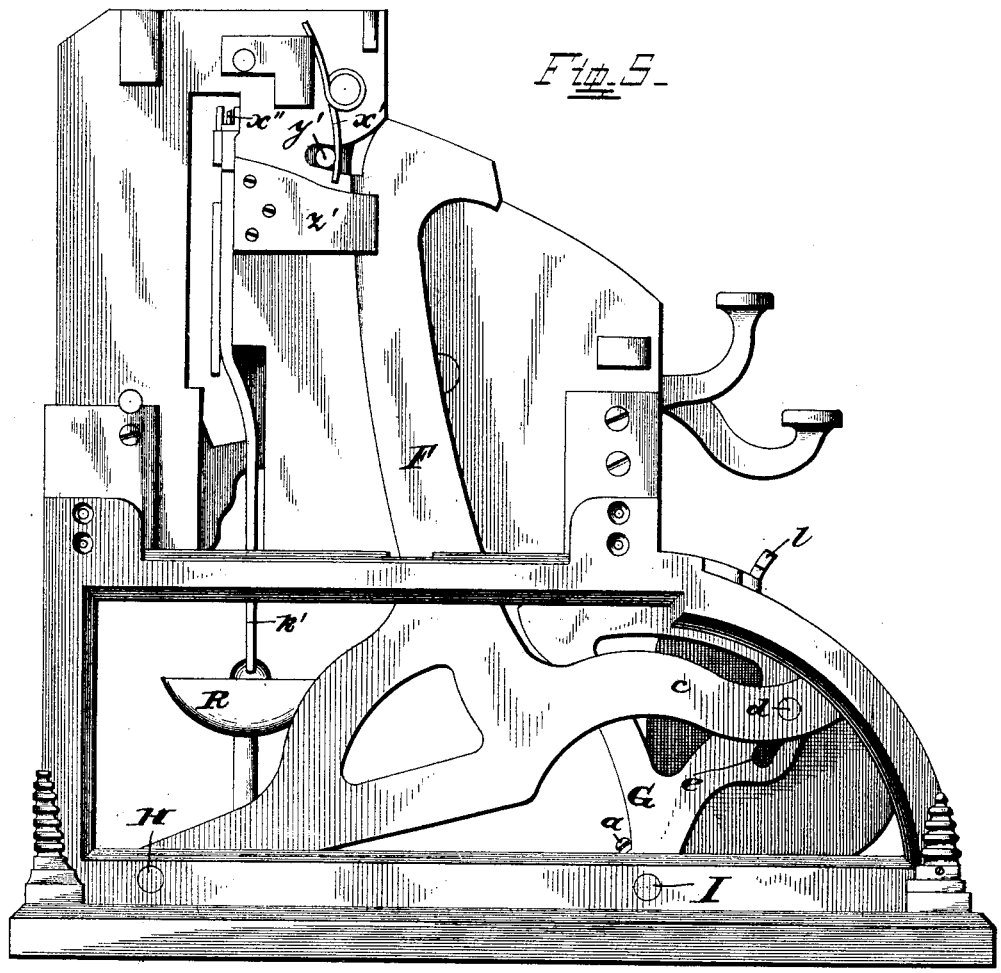
Figure 6:
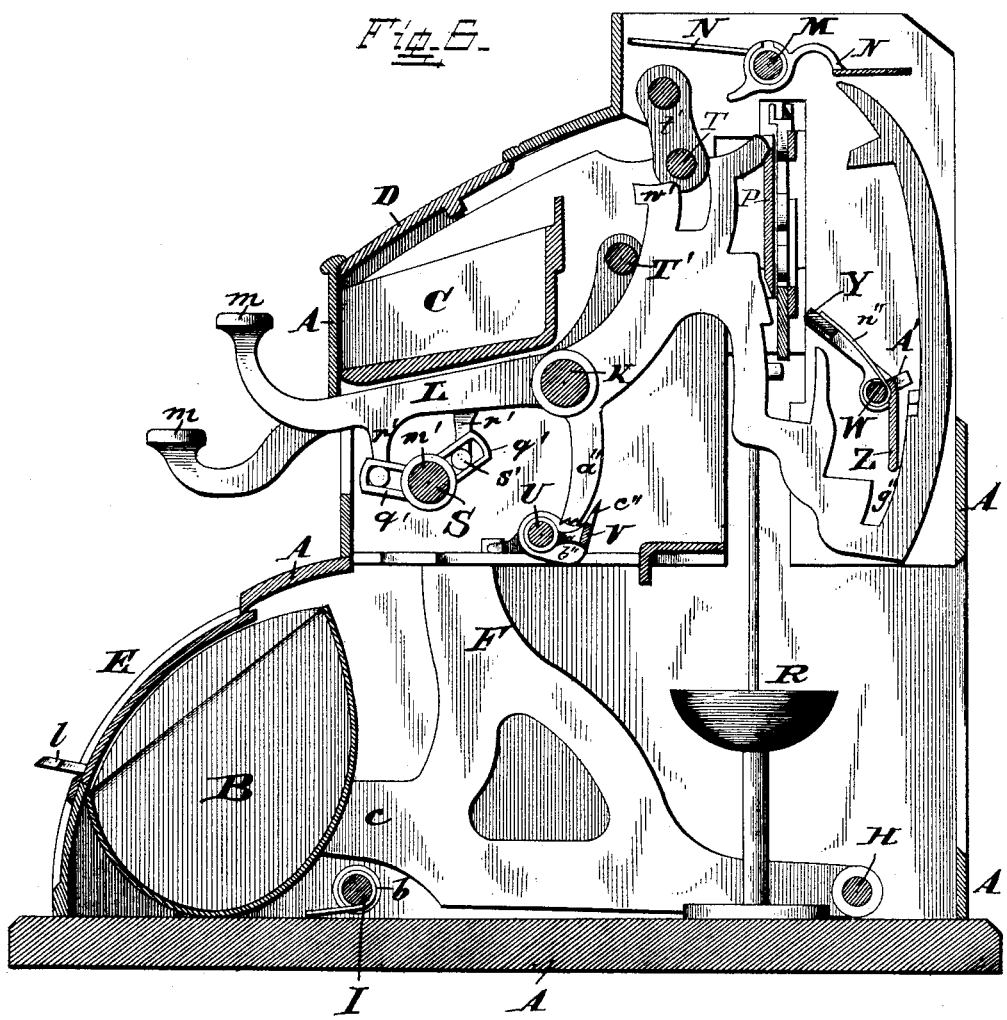
Figure 7:
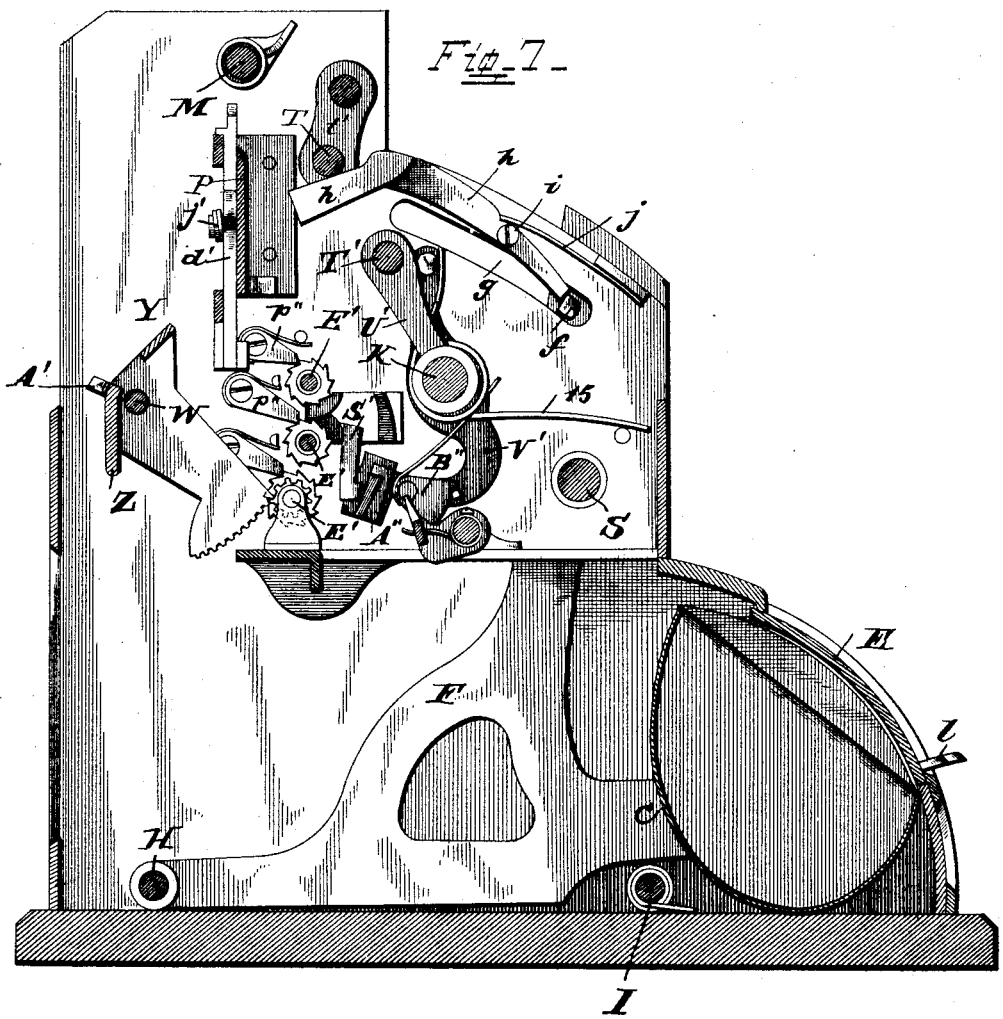

In the drawings, Figure 1, Sheet 1, is an external perspective view of the completed machine. Fig. 2, Sheet 2, is a top plan view of the register with the upper money-receptacle, the upper casing, and a part of the indicating-tablets removed. Fig. 3, Sheet 3, is a back view in elevation of the register as shown in Fig. 2. Fig. 4, Sheet 4, is a side elevation of the right-hand side of the register, with a part of the casing removed, showing the registry and adding disks and transfer mechanism. Fig. 5, Sheet 5, is a similar side elevation of the left-hand side of the register with the side panels of the case removed. Fig. 6, Sheet 6, is a sectional side elevation taken in lines $x\ x$ of Fig. 2, looking toward the left-hand side of the register, with recording mechanism omitted. Fig. 7, Sheet 7, is a sectional side elevation, taken on lines $y\ y$, looking toward the transfer mechanism. Fig. 8, Sheet 8, is a front perspective view of the oscillating bar by which the indicating-tablets are supported and the gong sounded. Fig. 9, Sheet 8, are perspective views of a pair of the indicating-tablets and coiled spring which acts on same. Fig. 10, Sheet 9, is a perspective view of one of the upper bank of operating-keys. Fig. 11, Sheet 9, is a perspective view of one of the lower bank of keys. Fig. 12, Sheet 9, is a detail view in perspective of the graduated arms on the keys for actuating the registering mechanism. Fig. 13, Sheet 10, is a perspective view of two of the keys, showing my key-coupler and key-arrester applied thereto. Fig. 14, Sheet 10, is a detail of one of the ratchet-arms of each key. Fig. 15, Sheet 11, is a detail view in perspective of a part of the registering mechanism. Fig. 16, Sheet 11, is a front view of one group of interlocking hubs which prevent the operation of more than one key of a series at a time. Fig. 17, Sheet 12, is a detail view in perspective of a portion of the transfer mechanism. Fig. 18, Sheet 12, is a detail view in perspective of the mechanism employed for operating the transfer devices. Figs. 19, 20, 21, 22, and 23, Sheet 13, illustrate the pawl-carrying transfer bifurcated arm and transfer-pawls in various positions, Fig. 20 being the reverse of Fig. 19. Fig. 24, Sheet 14, is a side elevation of a part of the recording mechanism, showing the type-bar, recording-paper, and ink-ribbon. Fig. 25, Sheet 14, is a side view of the clock-movement for governing the time-record; Fig. 26, Sheet 14, a bottom plan view, looking upward, showing the application of the clock-movement to the recording mechanism. Fig. 27, Sheet 15, is a perspective view in detail of the mechanism for moving the recording-paper and stamping-plate. Figs. 28, 29, and 31 are perspective views in detail of pawls $w''$, 3, and 8 of the transfer mechanism. Fig. 30 is a side view of pawl 3; Fig. 32, a front view of pawls 3 and 8. Fig. 33 is a perspective view of the lower fork of the bifurcated pawl carrying the transfer-arm.

Like letters and numerals of reference indicate identical parts in all the figures.

A A is the casing or frame-work of the machine, consisting of bottom, side supports, and cross-braces and having various ornamental panels, as shown in Fig. 1, to form a complete casing for the working parts. The upper portion of the case is provided with glass windows, through which the indicating-tablets may be seen upon the operation of the keys, as is usual in machines of this class.

Two stationary money-receptacles B and C are provided, securely fastened to the case in any convenient way. These receptacles are closed by the lids or covers D E, which are secured to and supported by arms F F and G G, made to conform on their upper supporting-surfaces with the curvature of the lids D and E. The supports F F of the upper cover D are secured to the rock-shaft H, which extends from side to side at the rear and bottom of the case and is journaled in the sides of the frame, while the arms G G of the cover E are likewise secured to a similar rock-shaft I, journaled likewise in the sides of the frame. Coiled springs $b$, of sufficient strength, on each end of the front shaft I, one end of each spring bearing against the bottom of the case and the other ends secured to the shaft by screws $a$, Fig. 5, tend to rock the same and raise the arms F and G, and thus throw back the covers D and E, the cover E swinging on a radius of which the rock-shaft I is the center, while the cover D swings on a radius of which the rock-shaft H is the center. It will be noted that the cover E of the lower receptacle, in order to uncover fully the same, has to swing back as far or farther than the upper cover, and also that the uncovering of both receptacles should be accomplished in the same period of time. Therefore the lower cover, which has the shorter radius, will have to move more rapidly than the upper cover in order to pass over the same or a greater distance in the same space of time. This could not possibly be accomplished by the use of one arm with both covers attached thereto. It is further desirable, in order not to unnecessarily increase the parts, that both receptacles should be disclosed simultaneously by one movement. In order to accomplish these results, I provide as follows: The arms F F have forward extensions $c$ $c$, carrying pins $d$ $d$, Fig. 5, which fit within the slots $e$ $e$ in the arms G G, and in this way any movement of either of the arms F or G carries the other set and its cover with it, and at the same time a differential rate of speed is obtained in the two covers, so that they will open and close simultaneously. A pin or lug $f$, Fig. 7, at the upper part of one of the arms F extends inwardly within a slot $g$ in the case, and a latch $h$, pivoted to the inner side of the case by screw $i$ and held down by the spring $j$, bears against this lug $f$ and holds the covers of the money-receptacles shut till the latch is released, as will be hereinafter described. A handle $l$ is attached to the lower cover E for convenience in closing same. These two separate money-receptacles are preferably arranged the lower one for coin, divided by partitions $k$, and the upper one for currency, and the two compartments being separated by the operating-keys a very convenient arrangement is obtained.

In machines of this class as hitherto constructed the money-receptacle has ordinarily consisted of a single movable money-drawer arranged to be released and thrown out from the case by the operation of the keys, or a single stationary compartment with sliding lid has been provided, or in some cases a combination of the two has been arranged, one compartment being stationary and the other a drawer; but the novelty of my money-receptacle consists in providing the two compartments both stationary and separate from each other by the banks of keys or otherwise, so that there is no chance of confusion in placing the money in the wrong compartment, and, further, no mechanical device has to be employed for moving the money, so that the means employed for uncovering the receptacles always has uniform work to do, which is not the case where money-drawers are used, in which the accumulated coin of a day's sales often adds very materially to the weight to be moved. The means above described for accomplishing these results forms a novel and valuable feature of my invention, which is not to be limited in its use to the machine I have described, but is plainly applicable to other classes of machines in which money-drawers are now employed.

In connection with the arms F F, I use a novel form of bumper to prevent any jar or noise when the covers are thrown open, which at the same time prevents any rebounding of the parts. This consists of a spring-plate $z'$, Fig. 5, securely fastened to the side of the frame of the machine by screws or otherwise, while its free end is slightly raised from the surface of the frame-work. The back edge of the arm F is sharpened in order to slide in between this spring-plate and the surface of the frame-work, so that the spring-plate $z'$ will press against the outer surface of the same, and thus form an effectual bumper which will also grasp the arm and prevent rebounding.

Extending through the central portion of the case from side to side is the shaft K. Upon this shaft are pivoted from side to side the series of operating-key levers L, extending out through slots in the case in front, and with their rear extremities guided in slots $n$, Fig. 2, at the back of the case. These operating-keys are provided with numbered buttons $m$, and are arranged for the operator in two banks or rows, as is usual, to economize space. These keys are divided into three groups for actuating the registering mechanism, as will be hereinafter fully described, the first nine keys on the right being numbered from 1 to 9 and representing units or cents, the next nine keys in the middle representing the tens or dimes and numbered from 10 to 90, and the remaining ten keys on the left representing the hundreds or dollars and being numbered from 1 to 10. An odd key is shown in Fig. 2, (lettered CK,) which, when operated, does not effect any registration, and, if desired, other keys could be added to represent "Amounts charged" or "Paid out," or otherwise.

In the upper part of the case, extending longitudinally from side to side, is a shaft M. Upon this shaft are strung and pivoted a series of indicating-tablets N N, numbered on both sides to correspond with the numbers on the key-levers. Two of these indicating-tablets are shown in detail in Fig. 9, Sheet 8. They normally lie in a horizontal position, resting on the tops of the keys, so as to be out of sight, as shown in Figs. 2 and 3, and are arranged in pairs with their indicating-faces alternately to the front and the rear of shaft M. All of the rearward-extending tablets are similar to each other and are made up (see Fig. 9) of indicating-face $o$, central hub $p$, curved connecting-arm $q$, and curved lug $r$, and all the frontward-extending tablets are likewise similar to each other and made up of indicating-face $o$, hub $p$, straight arm $s$, curved lug $r$, and straight connecting-arm $t$, the indicating-faces $o$ $o$ being twice as wide as the hubs and other parts. A notch $u$, preferably beveled inward, is cut in each of the hubs $p$, so that for each pair of tablets the notches will be adjacent to each other, but on opposite sides of the supporting-shaft, when the pair of tablets are lying in their normal position, and a small coiled spring $v$ is placed around the shaft M, so that one end will bear within the notch in the hub of one tablet of the pair and the other end have a similar bearing in the notch in the hub of the other tablet, one coiled spring being used for each pair of tablets, the tendency of which spring is to return the tablet raised to its normal position and at the same time by bearing against the beveled notches $u$ to draw the two tablets of the pair together. The bearings of the hubs on the shaft are recessed, as shown in Fig. 9, in order to make room for the springs. The indicating-tablets are arranged thus in pairs lying alternately on opposite sides of the supporting-shaft in order to economize space, for it will be noticed that, the hubs and arms being only half the width of the indicating-face, by thus being arranged alternately two tablets only take the space that one would take were they arranged to rotate on the shaft in the same direction.

The ordinary indicating mechanism of machines of this class consists of a series of indicating-tablets supported in a vertical position by tablet-rods and adapted to be raised in a vertical plane. This method, however, is not as simple and cheap in construction as the rotating tablets shown in my machine. I am aware that indicating-tablets have hitherto been strung or pivoted on a shaft extending longitudinally at right angles across the case; but that arrangement has hitherto not been found practical, because the tablets were all arranged to rotate on the same side of the shaft, and therefore space could not be economized without the tablets interfering with each other. I am also aware that the indicating-tablets have also been strung on a shaft or shafts parallel with the plane of the operating-keys; but in that case, also, they are arranged to rotate on the same side of the shaft. I am also aware that various other forms of rotating tablets have been used, arranged on a shaft similar to mine, with the indicating numbers disposed on the periphery of circular or hexagonal bands. These forms of tablets, however, are expensive in construction, and in order to economize space the numbers have to be placed in groups on each band, requiring mechanism to control the rotation to display the proper numeral, or the indicating-faces of the tablets have to be disposed in different planes to prevent interference. I believe, however, I am the first to combine the advantages of both classes of indicating mechanism. The indicating-tablets are flat disks, such as are used in the former class. They can likewise be arranged in the same lateral space by overlapping each other, while as in the latter class they can be easily strung on the supporting-shaft, as described. They require no attachments to tablet-rods. One coiled spring is sufficient for two tablets, both to return them to place and to keep the pairs of tablets together and prevent them spreading apart and crowding the rest of the tablets on the shaft, and thus dispensing with the screws or pins which would be necessary if a separate spring were required for each tablet. The complete tablet can be cast in one piece and the entire indicating mechanism can be adjusted and arranged at a moment's notice. These features form novel and valuable parts of my invention and are not intended to be limited to the machine I am describing, but are plainly applicable to other classes of machines which employ indicating mechanism. The indicating-tablets are rotated into a vertical position by the operating-keys, so that upon striking any key its value is shown by the proper indicating-tablets. The back rows of tablets, having the curved connecting-arms $q$, are raised by the arms on the operating-keys whose numbered buttons $m$ are in the top row, while the front row of tablets is raised into view by being rotated in the opposite direction by the keys of the lower bank. The upper bank of keys has projecting upward the arms $v\ v$, preferably curved to form the arc of a circle of which the shaft K is the center. The ends of the key-levers are thus curved in order that none of the power applied to the finger-buttons $m$ in raising the indicating-tablets may be lost or split up into resultant forces, as is the case where the ends of the key-levers raise vertically-reciprocating tablet-rods—a feature of some novelty and importance, for in machines of this character the key-levers have so much mechanism to operate that every loss in the application of power is in the end apt to become a serious matter in the practical operation of the machine. The depression of any key of the upper bank will therefore bring the upper end of the arm $v$ against the under side of the curved arm $q$ of its corresponding tablet, which is arranged directly in the path of motion of the top of the arms $r$. This throws the tablet into a vertical position, and in order to prevent any violent movement of the key from rotating its tablet too far a series of positive stops $w$ is arranged on these keys, against which the curved arm $r$ of the tablet comes in contact and thus stops the rotation thereof. The front series of tablets are rotated in the opposite direction into a vertical position in a like manner by the arms $y\ y$ on the lower bank of keys. The back faces of the downwardly-extending arms $s\ s$ of these tablets rest upon these arms $y\ y$, so that in the upward rotation of the arms $y\ y$ upon the depression of the keys the tablets are thus rotated into a vertical position. This series of tablets is prevented from rotating too far by the curved arms $r\ r$ coming in contact with pins or stops $x''$ on the cross-brace P of the machine. Pivoted in a vertical position to the rear face of the cross-brace P at $a'\ a'$ is an oscillating frame. (Shown in front perspective in Fig. 8, Sheet 8.) This oscillating frame is made up of the bars $b'\ c'$ and the end bars $d'\ d'$, all pivoted together, so as to allow a lateral oscillation of the bars $b'\ c'$ in opposite directions. A spring $j'$, Fig. 3, secured at its middle point to the cross-brace P, bears with its ends equally on the bars $b'\ c'$, so that until vibrated the frame remains in equilibrium, while pins $z''$ limit the action of the spring $j'$, so that the frame after vibration is quickly brought to rest. On the upper bar $b'$ are arranged a series of lugs $f'\ f'$, extending upward and corresponding in number to the indicating-tablets, alternately facing to the front and rear and beveled on opposite sides. When the oscillating frame is in its normal position, this series of lugs $f'\, f'$ stands directly in the pathway of the rotation of the curved arms $r\, r$ of the indicating-tablets, as shown in Fig. 3, and no tablet can be raised, as the arms $r\, r$ of the tablets will come in contact with these lugs. On the lower bar $c'$ is another series of lugs $e'\, e'$, extending downward, in number the same as the upper series. These lugs $e'\, e'$ carry beveled shoulders $g'\, g'$, extending out from their front faces. On each operating-key there is a similar lug or shoulder $h'\, h'$, beveled in the same direction, and the operating-keys and oscillating frame are so arranged that upon the depression of a key these beveled lugs or shoulders will be brought in contact, and the further upward movement of the key will shift the lower bar $c'$ laterally to the right, and the upper bar $b'$ will move to the left a corresponding amount, thus clearing the pathway for the proper tablet to be raised, while the little coiled spring $v$, bearing on the hub of the tablet, will return any tablet that may have been held up to its horizontal position. Upon the complete depression of a key, however, the beveled lug $h'$ on the key will move past the lugs $g'\, g'$, when the action of the spring $j'$ on both bars of the frame will cause the frame to vibrate violently for a moment. Cast solidly or rigidly secured to one of the end bars $d'$ is a hammer $k'$, extending downward to the gong R. The vibration of the oscillating frame causes the hammer to strike the gong, and thus upon the depression of any key the bell will be sounded. In order to allow the key and its beveled lug $h'$ to be returned to place without materially oscillating the frame and sounding the gong, the lower part of the lugs $e'\, e'$ are cut away, as shown at $l'$, in order to allow an almost uninterrupted passage of the beveled lugs $h'\, h'$ to place. It will thus be seen that upon the depression of any operating-key and the consequent raising of its rear end the oscillating frame will be moved laterally to allow the proper tablet to rise and to release any tablet already displayed. The upper bar will then be thrown back to its normal position to catch and hold up the tablet that has been raised, and at the same time the vibration of the frame will strike the gong. I am aware that a laterally-oscillating bar, with shoulders, has been employed to retain in position vertically-reciprocating indicating-tablets as distinguished from my rotating tablets; but I know of no arrangement wherein the gong-hammer is a rigid part of this oscillating frame, so that the lateral displacement of the frame to release a tablet and allow another to take its place will strike the gong. In such machines as have employed a supporting-bar for the tablet-rods the only function of the spring employed has been to return the supporting-bar to place to retain the operated tablet, while in my construction a vibrating spring is used, which not only returns the bar to place, but vibrates it suddenly for a moment, subject to the limitations of the pins $z''\, z''$, and therefore I can attach my gong-hammer or cast it rigidly to the end of the bar $d'$, because the sudden vibration will throw the hammer against the gong, while the spring normally holds the hammer away from the gong—a result that manifestly cannot be accomplished where a mere returning-spring is used. By this construction I am able to dispense with several parts which have hitherto been necessary to trip the striking-hammer of the gong.

I do not, of course, wish to be limited to the particular form of spring shown, as other springs or their equivalents, weights, and the like might be equally well used to accomplish the same result. It is, moreover, not essential that the oscillating frame should be vibrated by the action of the keys, as I have described, as any convenient means may be employed; nor is this part of my invention to be limited to the particular machine I have shown, but is obviously applicable to other machines in which other tablet systems are used.

In machines of this class in which a single registry-wheel is actuated to different degrees by a group of keys means must be devised to prevent the operation of two or more keys of a group simultaneously, for otherwise the key of the highest value will alone be registered. The means devised heretofore and in common use have been usually a series of stops arranged in the pathway of the key to allow the passage of but one key at a time. In my machine, instead of using stops, I use a series of interlocking parts, each pivoted to a separate key and arranged so that one of the parts can be operated; but when it is sought to move two or more they interlock and so prevent the simultaneous operation of two or more keys.

Extending across the machine, parallel with the key-shaft K and underneath the front ends of the keys, is a shaft S. Strung and pivoted on this shaft is a series of hubs $m'\, m'$, one for each key-lever. These hubs are arranged in groups to correspond with the groups of the keys, and between each group is a plate or stop $n'$ rigidly secured to the shaft itself, so as to separate the group of hubs from each other. Each hub is provided with lugs or projections $o'$ and corresponding recesses $p'$ to receive the lugs on the adjoining hub. The separating-plates $n'$ are also provided with similar recesses and projections. Extending out from each hub is a slotted arm $q'$, integral therewith, the hubs being arranged on the shaft with these arms alternately to the front and to the rear of the shaft S and with the projections or lugs $o'$ fitting within the recesses of the adjoining hubs. The distance between the fixed plates $n'$ between each series of hubs is such as to allow one hub to rotate and push the others aside; but there is not sufficient space to allow two or more to rotate at the same time in opposite directions. Upon each key L is a downward-extending arm $r'$, with a pin $s'$ extending out at right angles thereto to engage with the slotted arms $q'$ of these hubs. It will be seen that if one key of a group is depressed the corresponding hub pivoted thereto will turn with the key; but if it is sought to operate two or more keys at a time the hubs will interlock with each other and prevent such operation. It is necessary with this arrangement of hubs, however, to arrange them to rotate in opposite directions, for if the slotted arms were all disposed on the same side and it was sought to operate two or more at a time the hubs to be rotated would lock together and would then form a single hub and there would be space to allow them to move together; but by alternating them, as described, if two or more hubs that rotate in the same direction are sought to be moved the intermediate hub or hubs will still lock them, which would not be the case if they all rotated in the same direction.

In machines of this class where it is desired to indicate and register amounts which require the simultaneous operation of three keys of different groups it will be obvious that it is advantageous, and it has been customary, to provide means for coupling together keys that may be operated, so that after the proper keys are started should the fingers of the operator slip from any of the keys the pressure on even one of the keys will carry the others with it. The means I employ consists of a bar T, extending horizontally across all the keys and fixed to side arms $t'$ $t'$, which are pivoted to the sides of the case, so as to allow the bar T to swing over the keys. Immediately underneath this bar T the several key-levers are provided with slots $u'$ $u'$, inclined in the direction of an arc of a circle whose center is the shaft K of the key-levers. The operation of any two or more keys of different groups will bring the bar T within the slots $u'$ $u'$ of such keys and inasmuch as the slots of the keys are inclined away from the path of motion of the bar T as soon as the bar T has entered the slots $u'$ $u'$ the keys operated will become coupled together and the operation of one key will carry the others with it. It will also be noticed that the operation of any key as the bar T enters its slot will swing the bar out over all the other keys, so that the flat surface $w'$ $w'$ of the unoperated keys will be then directly under the bar T, and thus all the unoperated keys will be locked. A small spring $x'$, Fig. 5, coiled on the pivot of the bar T, bears against a pin $y'$ on the end of the bar and keeps the same over the slots in the keys; otherwise the weight of the bar would swing it out over the surfaces $w'$ of the keys and lock them all. This key-coupling bar T also performs another function. Resting underneath one end of the same is the latch $h$, and upon the operation of any key of the register and the consequent swinging out of the bar T, common to all the keys, the latch $h$ will be depressed, releasing the side arm F and allowing the covers of the money-receptacle to be thrown back, as heretofore described. In machines of this and other classes it has also been customary to provide means for arresting the key after it has been started to prevent its return to place until it has completed its stroke; otherwise after a key had been struck and a partial registration made the finger of the operator might slip from the key, which would then return to place without the gong being struck or the indication of the proper amount on the indicating tablets. One method of accomplishing this result has been by a system of racks and pawls to prevent the return of a key; but with this arrangement it has always been necessary to provide means for holding or throwing the pawl out of engagement with its rack during the return stroke of the key. In my machine I likewise employ a tooth or teeth on each key and engage therewith a pawl-bar extending across all the keys of a group; but the novelty of this part of my invention consists of my novel means for the return of the key to place without any pawl-releasing mechanism. An arm $a''$ extends downward from each key, having formed on the lower end thereof one or more teeth, (one tooth is sufficient for the purpose in my machine;) but I have shown two teeth in the drawings, as two or even more teeth could be used if desired. Extending horizontally across the machine from side to side and in front of this series of arms $a''$ is a shaft U. Upon this shaft are pivoted by the side arms $b''$ $b''$ three pawl-bars V to correspond with the three groups of keys, the pawl-bars being provided with teeth $c''$ at proper intervals to engage with the tooth on the arms $a''$ of the keys. These pawl-bars are swung loosely on the shaft U and are capable of a lateral movement on the shaft against the pressure of the coiled spring $d''$, one end of which is fast to the shaft and the other bears against the under side of one of the arms $b''$ of the pawl-bar, so as both to keep it in a horizontal position and press it to the right. Upon the left side of each of the arms $a''$ is cut a double-beveled recess $f''$, deeper and wider at its front end than in the rear, as shown in Fig. 14, while each of the teeth $c''$ of the pawl-bar is also beveled to form a projection to enter this double-beveled recess. As soon as a key-lever has been depressed slightly one of the pawl-bar teeth will engage with the first tooth on the arm $a''$ and prevent the key from returning to its normal position, as shown in Fig. 13. After the arm of the key has passed the tooth of the pawl-bar and is on its return the beveled recess $f'''$ of the arm engages with the tooth of the pawl-bar and shifts the entire bar laterally on the shaft U against the pressure of the coiled spring, and thus the arm after it has passed the pawl-bar can be readily returned to place, because of this lateral shifting of the bar, while as soon as the arm $a''$ has passed the bar on its return stroke the pawl-bar is at once returned to its normal position through the action of the spring $d''$.

The co-operation of my key-coupler and key-arrester as arranged in this machine enables me to accomplish a novel and very useful result not attainable in other machines of this class embodying a series of groups of keys and an actuator for the registering mechanism common to the group. For example, suppose it is desired to register such a sum as one dollar and forty-nine cents. The dollar-key is at the extreme left of the keyboard, while the nine-cent key is at the extreme right, with the forty-cent key in the middle. For a person with a small hand or a one-handed man it will be almost, if not quite, impossible to strike these keys simultaneously. I have therefore so arranged the parts that the keys may be started one after the other. It will be noted that before the registering and indicating mechanism is acted upon the work the keys have to perform is very slight. The adjustment of the slots $u'$ in the keys, co-operating with the bar T, and the rack-teeth on the arms $a''$, co-operating with the pawl-bar V, is such that the pawl-bar will catch and hold the key from resetting before the bar T has been swung out far enough to lock the other keys, while the extra power required to move the indicating and registering mechanism will serve as a guide to the operator to prevent him from moving the key too far. The user can therefore operate the keys in succession, pressing the dollar and forty-cent keys slightly till the key-arrester holds them from resetting and then operating the nine-cent key alone to its full limit, the key-coupler carrying the dollar and the forty-cent keys with it, and thus the machine will register and indicate the proper amount, "$1.49." This result cannot be accomplished in other machines of this class with which I am acquainted, because, as will appear at more length hereinafter, the devices necessary to compel the complete operation of the keys in such machines in order to effect proper registration lock the keys from any back movement at such short intervals, and the work to be performed by the keys being either uniform throughout or greater at the start than afterward there is no practical method of gaging the stroke of the keys to effect the desired operation.

In total-adding machines as ordinarily constructed for the purpose of registration it has been customary to employ a single registry-wheel for each group of keys, suitable means being employed to actuate the registry-wheel to different degrees for the various fixed values of the keys, and thus to register the correct values on the wheel. The means employed hitherto for this purpose have been by providing an actuator common to the entire group of keys carrying the means for operating the registry-wheel and either fulcruming each key at different points to this common actuator, so that the completed stroke of a key would move the actuator the proper amount, or by grading the distance between the actuator and the series of keys so that the complete stroke of a key would move the actuator the necessary distance to register the value of the key; or other means have been devised, such as a series of segment-racks, actuated by the various keys, having teeth corresponding in number to the value of said keys, so as to turn the registry-wheel the proper number of teeth; but in all of these methods and others in use in order to make the proper registration it is necessary for the operated key to complete or very nearly complete its stroke before the registration is accomplished, because where such means are employed the key of the smallest value must act on the actuator only at the end of its stroke, as all the keys have the same length of stroke. For example, take the common arrangement where the actuator is a bar inclined laterally and transversely to the keys. The one-cent key must strike the bar at or nearly at the end of its stroke and not before, else a wrong value would be registered by moving the actuator too far, and the same is true of the other devices in use. As a result of this supposed necessity for the complete stroke of the key before the registration is completed great difficulty has been experienced in the construction of a machine which could not be improperly used by a dishonest employé. For example, suppose it is desired to register such a sum as nine dollars and five cents on machines as ordinarily constructed. The dishonest employé will operate the nine-dollar and the five-cent keys; but just before the nine-dollar key has completed its stroke let him pull back strongly on this key while still pressing the five-cent key. The five-cent key will open the money-receptacle, ring the bell, and indicate and register its value, while the nine-dollar key will also indicate its value on the tablets; but the strong backward pressure on the nine-dollar key will cause it to spring back and fail to move the registry-wheel the last tooth or the last two teeth, and thus one or two dollars will be lost. This is a defect that it is very difficult to overcome in practice, because with the ordinary rack-and-pinion mechanism a movement of a thirty-second of an inch will often move the registry-wheel one tooth, and the working parts will almost always "give" to back-pressure to that extent. The fault lies, principally, in requiring the complete stroke of the keys to effect the registration, for if the registration is begun at the beginning of the stroke for all keys alike, so that the key may have considerable movement after registration to complete its initial stroke, such manipulation can avail nothing. Another difficulty experienced is that the employé by operating the keys very rapidly with a quick sharp stroke can get up such momentum therein as to make it very difficult to stop the registry-wheel actuated thereby at the proper point. Thirdly, in old machines where an actuator is used common to a group of keys and moved thereby the arrangement has always been such that the actuator would rise and fall with the movement of the key, so that without special devices to prevent it "pumping" could easily take place—i. e., during its forward or backward stroke the key could be moved back and forth to register indefinite sums. One chief feature of my invention consists of a novel construction and arrangement of parts to overcome these defects, a construction simple in itself, without any multiplication of parts to accomplish the result, and yet so effective and substantial that it is impossible by springing the keys by any quick sudden movement thereof or by pumping or otherwise to cause the machine to register falsely. I accomplish these results by three fundamental changes in structure which I believe to be novel in the art. In the first place, while I use an actuator common to all the keys of a group, and means connecting the actuator with a single registry-wheel, I do not grade the distance between the actuator and the several keys so that the keys of small value act on the actuator only at the completion of their stroke, and thus compel the complete operation of a key to effect its proper registration with all the attendant difficulties above set forth; but I arrange my actuator so that its distance from the entire series of keys is practically the same for each key, but so that the engagement-surfaces between the two will be of different lengths, and thus the actuator be moved different degrees for the different values of the keys, a construction which allows the registration of the value of the key, for all keys alike, to commence at the beginning of the stroke, and the first defect due to springing of the keys is overcome; secondly, I so arrange the actuator and keys that as soon as the value of the key has thus been registered the actuator is positively stopped from any further movement, no matter how swift the stroke and no matter what twists and strains the key may be subjected to; thirdly, the registry-wheels for the different groups of keys are all moved by the positive direct action of the keys on their downward and positive stroke, and although the machine belongs to the total-adding class and keys of the different groups can be operated simultaneously the registry-wheels are also all acted upon simultaneously, the actuating means being in direct and positive connection with the registry-wheel during the entire operation of the key from the commencement of its stroke until it is returned to its normal position, the actuator thus being held in whatever position it may be placed by the action of the key, so that pumping of the keys can not effect the registration and the necessity for spring-pawls or the like to compel the complete movement of the key in both directions are dispensed with.

The registration mechanism for each of the three groups of keys—that is, the units, tens, and dollars keys—being the same, I will confine my description mainly to the registration devices for the units or cents series of keys. Extending longitudinally across the case from side to side in the rear of the machine and supported in the sides of the same is the shaft W. Upon this shaft are pivoted the three actuators, one for each group of keys, as shown in Fig. 15, Sheet 11. These actuators are formed of three horizontal side bars Y, Z, and A', secured to end arms or bars B' B', which are loosely pivoted on shaft W, so as to rotate and also slide laterally thereon. The downwardly-extending side bar Z extends across the key-levers, as shown in Fig. 6, the same being cut away at $g''$ to allow for the operation of the key-levers without disturbing this bar Z, while the bar Y extends horizontally across the lugs or projections C' on the key-levers. These projections C' are all of practically the same height, so that the bar Y is practically the same vertical distance from the initial contact-point of each key in its upward movement; but these projections C' are graded lengthwise of the keys, as shown in Fig. 12, the one-cent key (marked 1 in Fig. 12) having a very slight contact-surface $h''$, while the nine-cent key (marked 9 in Fig. 12) has quite a broad contact-surface $h''$, the keys between having each one-ninth less contact-surface than the next key of higher value. The back edge $i''$ of each of these projections C' is shaped in the arc of a circle whose center is the shaft K of the key-lever, and as the rear end of a key is raised by the depression of the finger-button the contact-surface $h''$, coming in contact with the operating-bar Y, will rotate the actuator to an extent determined by the breadth of this contact-surface. As soon, however, as the projection has passed the operating-bar the bar will then rest against the edge $i''$ and will be prevented from returning to place, while the further raising of the key will not move the actuator at all, inasmuch as the sliding point of contact between the two will continue on the arc of the same circle whose center is the shaft K of the key-lever. Further than this, the lower back edges $k''$ of these projections C' are also cut in the arc of a circle whose center is the key-shaft K, and are so arranged that when the upper contact-surface $h''$ has just passed the operating-bar Y the lower edge of the stop-bar Z will be brought into contact therewith, so that the upward movement of the actuator is positively arrested, while at the same time the key can continue its upward movement. It therefore follows that no matter how rapidly you operate the key-lever it is absolutely impossible to move the actuator more than the value of the key operated calls for. This arrangement of parts, in which the actuator is extended horizontally across the keys at practically equal distances from all the keys of the series, forms a very important and valuable feature of my invention, and its use is not intended to be restricted to the particular form of total-adding machine I have here illustrated, for this arrangement of parts can be advantageously applied to other classes of machines where it is desired to register the value of a key of a series through the medium of an actuator common to the series. Pivoted in the frame at one end and in standards D' D' D' at the other are three shafts E' E' E', one for the cents, one for the dimes, and one for the dollars group of keys, carrying the pinions F' F' F' on one end and the registry wheels or disks G' K' L' on the other, the pinions having each ten teeth. The registry-disks are numbered on their external faces from 0 to 9 to correspond with the teeth on the pinions F' F' F', and all the disks are covered with the shield Z'', (shown in dotted outline, Fig. 4,) so as to conceal all the numerals on each disk except one. In this way the movement of a pinion F' one or more teeth will turn its corresponding registry-disk a corresponding number of points, as will be readily understood. These registry-disks and attendant mechanism are closed in the finished machine by door Y'', (shown in Fig. 1,) which can be locked with a suitable key kept by the proprietor, so that no operator of the machine can have access to the same to tamper with the mechanism. The right-hand side arm B' of each actuator is extended to form a segment-rack H', having ten teeth, the back edge of this rack being extended so as to rest against the back of the case and hold the actuator in the position shown in Fig. 6, with the operating-bar Y over the lugs C'' on the keys and the stop-bar Z in close proximity to the edge $g''$ of the keys. In its normal position this segment-rack is out of line with its pinion F'; but whenever a key is operated it is at once thrown into mesh, as follows: The third bar A' of the actuator extends back, slightly inclined upward therefrom, and is provided with a series of teeth $l''$, beveled on the lower edge, one for each key, while each key carries a beveled projection or shoulder $m''$ to engage with the beveled teeth $l''$ on this shifting-bar A'. A coiled spring $n''$, Fig. 3, one for each actuator, is coiled on the shaft W, one end resting on the frame or standard and the other against the end of the operating-bar Y, so as to hold the actuator with the segment-rack H' resting against the back of the case and at the same time press the actuator to the left, when the segment-rack H' will be out of line with the pinion F'; but as soon as a key is operated the beveled shoulder $m''$ on the key, striking the beveled tooth $l''$ of the bar A', shifts the actuator so as to bring the segment-rack into line with its pinion, and the further operation of the key rotates the actuator sufficiently to turn the pinion F' and its registry-wheel as many teeth as there are units in the key operated. This shifting of the actuator-bar, however, must be accomplished without rotating or tending to rotate the actuator so as to cause registration, which result I accomplish by my novel construction and arrangement of parts. The actuator is shifted from the side opposite to the operating-bar and in such a direction as to tend to rotate the actuator in the wrong direction, so that any tendency to rotation under the stroke of the shifting mechanism will be contrary to the rotation given it by the operating-bar. To accomplish this, the shifting-bar A' is inclined slightly upward and the operated key strikes same from the rear, so that any tendency to rotate is to throw the segment-rack away from its pinion, while the back of the segment-rack rests against the case to prevent any such movement. It will be seen, further, that with my actuating mechanism, until the key has nearly completed its return stroke, the segment-rack will be held in mesh and will only be released when the key has passed from between the teeth $l'' l''$, and thereupon the actuator, under the pressure of the coiled spring $n''$, will be shifted on the shaft W and the segment-rack be thrown out of mesh and drop back to its normal position. In order to prevent any return or back movement of the registry-wheels, I provide on the shafts E' E' E' a small ratchet-wheel $o''$ and dog $p''$ for each wheel. This shifting of an actuator common to a series of keys and carrying means for the operation of registry mechanism to bring the parts into mesh and holding it in mesh until the key is returned to its normal position is another valuable feature of my invention, and not necessarily limited to the machine I have illustrated; nor is it essential that the shifting of the actuator should be accomplished by the keys themselves, as many other convenient means could be employed. I am aware that it has hitherto been sought to shift the pinions into line with their respective racks upon the operation of the keys to effect the registration; but this construction is entirely different from mine, as will be readily seen.

It will be noticed that the registry-disks G' K' L' are moved on the positive downward stroke of the operating-keys, so that if a dollars, tens, and cents keys are operated simultaneously the three registry-wheels will also move simultaneously, so that it will not be possible when the units-wheel has made a complete revolution to transfer the ten directly to the tens-wheel and move it on one tooth, because if a units and tens keys are being operated at the same time, and consequently the units and tens wheels are moving at the same time, the transfer of the one tens would be lost, and the same is true of the transfer from the tens to the dollars wheel. It is therefore necessary "to save the transfer" until the registry-wheels have ceased moving under the direct impulse of the keys and arrange the parts so that the completion of a revolution by a tens-wheel, for example, will merely set the transfer devices, so that the transfer may be made after the registry-wheel has ceased to move; but it may happen that two transfers will have to be made at the same time, which must also be provided for. For example, suppose the registry-wheels read "2" on the dollars, "9" on the tens, and "9" on the cents wheels, showing that two dollars and ninety-nine cents have been deposited in the register, and suppose that one dollar and twenty-five cents is deposited, so that the one-dollar, the twenty-cent, and five-cent keys are operated simultaneously. Under the direct action of the keys the dollars-key will be moved one tooth and at the same time the dimes-wheel will be moved two teeth and the cents-wheel five teeth, so that the wheels will then show "3" on the dollars, "1" on the dimes, and "4" on the cents wheels. The dimes-wheel has, however, made a complete revolution and the ten dimes, or one dollar, have to be transferred to the dollars-wheel, which would make that wheel show "4," while the cents-wheel has also made a complete revolution and the ten cents, or one dime, should be transferred to the dimes-wheel. This can also be provided for by permitting each wheel to set its own transfer device and arranging the parts so that the closing of the money-drawer, the next positive stroke of the keys, or the back-stroke of the operated keys will complete this transfer. Such mechanism, I am aware, has been employed in total-adding machines of this class; but another difficulty now arises which has not hitherto been provided for. Suppose the registry-wheels read "$2.99," as before, and that one dollar and five cents is to be registered. Under the direct action of the keys the dollars-wheel will move one tooth and show "3" and the cents-wheel five teeth and show "4." The cents-wheel, having completed a revolution, will set its transfer device ready for the completion of the transfer with the next stroke of a key or on the back-stroke of the key being operated, or otherwise; but the dimes-wheel has not been moved at all as yet, so that wheel will still show "9," as before, and upon the completion of the transfer set by the cents-wheel the three wheels will then show "3" "0" "4," and the dollar which should have been transferred to the dollars-wheel is not shown. It is true this transfer has not been lost under the old methods, for the dimes-wheel when it was moved one tooth from 9 to 0 by the completion of the transfer from the cents-wheel has set its transfer device; but it takes another operation to complete the transfer, and even then the wheels may still show the wrong amount, for suppose ninety-six cents should be the next sum deposited. The registry-wheels would still fail to show a dollar deposited, for the direct action of the keys would show on the wheels "3" "9" "0," and the completion of the transfers, the one that was hitherto not shown, and the additional one, caused by the complete revolution of the cents-wheel, would cause the wheels to show the total sum of "$4.00" instead of "$5.00." The surmounting of this difficulty forms another novel and very valuable feature of my invention. In order to overcome this difficulty, it is expedient that there should be no transfer directly from the cents wheel to the dimes-wheel, because the difficulty above suggested is then sure to arise, and I therefore provide either a cents-wheel carrying a pinion with a hundred teeth instead of ten, and numbered progressively from 0 to 99, or a supplemental tens-wheel to take up the direct transfer of each ten from the complete revolution of the cents-wheel with only ten teeth. In this way it will be seen that the setting of the devices for the transfer is always made when ten dimes, or one dollar, are to be transferred to the dollars-wheel, and this transfer, from one or both of the wheels, can always be made in one operation, as will be hereinafter more clearly described. For the sake of uniformity in the construction of the machine, instead of having the cents-wheel with one hundred teeth and the other wheels only ten teeth each, I prefer to use a supplemental tens-wheel with ten teeth in connection with a cents-wheel of ten teeth, and thus not combine the two; but it will be understood that either form can be employed without departing from the spirit of my invention.

I will now proceed to describe my transfer and adding mechanism. M' is the supplemental tens-disk above referred to. This supplemental wheel is mounted to turn readily on the pin $q''$, fixed to the case and in such proximity to the cents-disk G' that when the cents-disk has made a complete revolution the pin or lug $r''$ (see Fig. 15, Sheet 11) on that disk will strike the disk M' and move it one tooth. The dollars-disk L' also carries a pin or lug $s''$, so that upon its complete revolution the tens of dollars may be transferred to the tens-of-dollars disk N', and similarly the counting-disks O' P', representing the hundreds and thousands of dollars, are arranged to be moved one tooth upon the complete revolution of the disk of the next lower denomination. These counting-disks could be added indefinitely to register up into the millions of dollars; but I have shown no counters higher than the units of thousands, so that nine thousand nine hundred and ninety-nine dollars and ninety-nine cents is the highest total that this machine will indicate, plus ninety cents on the supplemental tens-wheel, for that amount is as large as would practically be required in the ordinary use of such a machine before the counting-disks were reset to "0." It will be understood that in reading off the total from the registry-disks it will be necessary to add the number of tens shown on the supplemental wheel to the total from the other disks in order to get the exact amount deposited in the machine, as the supplemental wheel accumulates the tens from the units-wheel.

Loosely pivoted to the pin (not shown) having a concealing-head $t''$ is a bifurcated pawl-carrying and transfer arm R'. (Shown in detail, Figs. 19 and 20, Sheet 13.) This arm R' is pivoted loosely to this pin, so as to be capable of a rotation or vertical swinging movement on the pin as a center and also capable of a limited horizontal movement at its free ends; but it will be obvious that instead of a loose pivotal point the pivot could fit more snugly and the arm be hinged near the pivot to allow for the out-and-in or horizontal motion at the free ends thereof. The upper fork of this bifurcated arm carries two rack-teeth $u''$, (shown in Figs. 19 and 20,) while the lower fork is provided with two slots for the reception of two pawls, one behind the other and separated by a portion of the arm $v''$. (Shown in dotted lines, Fig. 17, Sheet 12.) The front pawl $w''$, Figs. 19 to 23, Sheet 13, is pivoted in the front slot by pin $y''$ and swings therein, limited in its forward motion by the pin 2 and in its back motion by the inner edge of the slot. The back pawl 3 is pivoted in the back slot of this lower arm likewise on the pin $y''$, which extends through both forks of the lower arm, and is likewise limited in its swing by the inner edge of the slot on one side and the pin 2, extending through both slots, on the other. The back pawl 3 is shaped at its inner end to conform to the front pawl $w''$, having an outwardly-projecting shoulder or lug 4 to correspond to the similar lug 5 on the front pawl $w''$. Rigidly secured to the back of the pawl 3 is a pin 12, (shown in dotted lines, Fig. 17,) extending back at right angles to the back face of the pawl, and likewise a right-angled arm 6, (shown in full lines, Fig. 17, where the balance of the pawl is in dotted lines; also shown in Fig. 20,) which right-angled arm, when the pawl is swung back against the slot in which it is pivoted, rests with its outer end against the frame of the machine at 7. The front and back plates of the lower arm of the bifurcated arm R' are sprung inward slightly, so as to press with a slight spring-pressure against both of these pawls $w''$ and 3, so that in whichever direction the pawls are thrown they will remain in that position until they are again acted upon. Pivoted to the front side of the back pawl 3 is a third pawl 8, carrying a little lug 9, extending out at right angles to its face. This pawl is normally held down by the spring 10 on the back pawl 3 in the position shown in Figs. 19 to 22, but is capable of being thrown up against the pressure of this spring into the position shown in Fig. 23. Rigidly secured to the upper fork of the bifurcated arm R' is an arm S', which arm extends back through an opening in the side plate or frame Y' of the machine, as shown in perspective in dotted lines, Fig. 17. The entire bifurcated arm R' is normally swung down by the spring 13, so that this arm S' rests against the lower edge of the opening in the frame-work of the machine, and so that when the arm R' is raised it will be against the pressure of spring 13, while the free ends of the bifurcated arm are normally held away from the side plate of the machine by the springs 14 14. (See Figs. 4 and 17.)

Extending across the entire series of operating-keys and resting thereon is a bar T', pivoted on arms U' U' to the key-lever shaft K. On the outer side of the right-hand arm U' of this bar T' is a lever V', Fig. 18, Sheet 12, pivoted on the same shaft K and carrying a pin W', extending out in front of the arm U', so as to be acted on thereby, the pin W' of the lever V' being held firmly against the arm U' by the spring 15. This lever V' extends down along the inner side of the side plate Y' of the machine and carries on its lower end a lug A'', extending inward from the side plate and having its lower face 16 beveled, as shown in Fig. 18. Immediately in front of this lug A'' and on the inner face of the lever V' is pivoted a dog B'', with two arms 17 and 18, while a spring 19, secured to the dog B'' and bearing against the shaft K, holds the dog normally with its upper arm 17 in contact with the lug 20 on the lever V'. Pivoted to the external face of the side plate Y' by the pin 21 is a hammer-lever C'', the same being guided in its motion by the pin 22, secured to the side plate Y' and working in the slot 23 of the hammer C''. Extending inwardly through an opening in the side-plate is an arm D'', an extension of the hammer-lever C''. This arm D'' carries on its inner end a pin 24, which bears against the under surface of the dog B'' on the lever V'. It will now be clear that whenever any one or more of the key-levers L of the machine are operated the power-bar T' will be swung forward and in turn transmit its motion to the lever V' through the medium of the pin W'. The dog B'' will strike the pin 24 of the hammer C'' and be thrown upward, allowing the lug 18 thereon to pass the pin 24. The spring 19 will then return the dog to its normal position and on the back-stroke of the key the lever V' will be returned to its normal position by the action of the spring 15, and the dog B'' will catch the pin 24 of the hammer and throw the striking end 25 upward until the pin 24 slides from under the dog, when the hammer will by its own weight drop back to its normal position. Thus with every operation of a key the hammer will be operated with a uniform stroke, as described.

Let us now return to the transfer mechanism. Under the action of the springs 13 and 14 the bifurcated pawl carrying and transfer arm R' will remain normally in the position shown in Fig. 4, with the arm S' resting on the frame Y', and the pawls $w''$, 3, and 8 swung to the left. In this position, with the free ends of the bifurcated arm R' raised from the side casing Y', the rack-teeth $u''$ of the upper fork thereof will be just out of line with the small pinion 27, Fig. 15, on the shaft E' of the dollars-counting disk L', which is located just without the case-plate Y'. The lower inner end of the arm S' will in that position be resting against the beveled face 16 of the lug A'' on the lever V', and the operation of any key will bring this beveled face 16 against the arm S' and draw the free ends of the bifurcated arm R' inward until the rack-teeth $u''$ are in the line with the pinion 27. With the transfer-pawls on the lower fork of the arm R' in their normal position the hammer C'' will be free to operate without function; but let us assume that the supplemental tens-disk M' has just finished a revolution—that is, that the cents-disk has accumulated the amounts registered thereon on its supplemental wheel until they amount to one dollar. It will readily be understood that this accumulation on the supplemental tens-disk could also accumulate on the cents-disk if its pinion were provided with a hundred teeth instead of ten and the disk were numbered to ninety-nine instead of nine, and all description concerning the supplemental tens-disk will apply as well to such modification. A small pin (not shown) on the under surface of the supplemental tens-wheel then strikes the gravity-pawl 29 and brings the lug 30 on the end thereof against the front pawl $w''$ on the bifurcated arm, this gravity-pawl being sustained in its normal position by the pin (not lettered) bearing against the same. (See Fig. 17.) This action throws the pawl $w''$ to the right into the position shown in Fig. 21, with its right-hand edge bearing against the frame of the slot. With the front pawl $w''$ in this position it will be struck by the hammer C'' on its upward stroke on the return of the operated key to place and the bifurcated arm will be raised, bringing the upper cog of the teeth $u''$ on the upper fork thereof into mesh with the pinion 27 on the dollars-wheel shaft and the same will be moved one tooth, thus transferring the one dollar from the supplemental tens-wheels to the dollars-wheel. Upon the return of the key operated to place the lever V' will withdraw its lug A'' from contact with the arms S, and the rack-teeth $u''$ will be thrown out of mesh with the pinion 27 under the action of the springs 14 on the bifurcated arm, while at the same time the lug 31 on the upper end of the pawl $w''$, which on the forward movement of the pawl $w''$ has entered the groove 32 in the pin 33, will be brought in contact with the head of this pin and return the pawl to its normal position, there to remain until another transfer is to be made from the supplemental tens-disk. Let us now assume that the regular tens-disk K' has completed a revolution and the one dollar is to be transferred to the dollars-disk. On the under surface of that disk is a pin 34, Fig. 15, similar to the pin on the disk M'. Upon the completion of a revolution of the disk L this pin 34 is brought into contact with the upper head 35 of the lever 36, Fig. 17, which is loosely pivoted on the cents-shaft E' and swings same to the right. The lower end of this lever 36 is in contact with the pin 12 on the back pawl 3 of the bifurcated arm R', and its motion is therefore communicated to pawl 3, and said pawl, and together with it the middle pawl 8, is thrown to the right, so as to rest against the frame of the fork. The hammer C'' on its upstroke will now come into contact with these two pawls. The middle pawl 8, being pivoted to pawl 3, will be thrown up out of the way into the position shown in Fig. 23, and the hammer, being against the back pawl 3, which, it will be noticed, is exactly the same distance from the rack-teeth $u''$ of the bifurcated arm as the front pawl was when it was thrown out, will raise said bifurcated arm the same distance as in the former transfer and the dollar-wheel will be turned one tooth. Upon the return of the bifurcated arm R' to its normal position, as before described, the right-angled arm 6 on the back pawl will come in contact with the edge of the case 7, Fig. 17, and the back pawl will thus be returned to its normal position, there to remain until another transfer is to be made from the regular tens-disk. Now let us assume that a simultaneous transfer from both the tens supplemental disk M' and the tens regular disk K' becomes necessary. In that case the front pawl $w''$ and the back and middle pawls 3 and 8 will be thrown out, as described above, for each singly; but now the middle pawl 8 will not be thrown back, as before, on the upstroke of the hammer; but the pin 9 on the pawl 8 will catch behind the lug 5 on the front pawl, thus locking them together, and the hammer C'', which, it will be understood, always has a uniform stroke, will strike pawl 8 and raise the bifurcated arm R' sufficiently to move the dollars-disk L' two teeth instead of one, both cogs of the part $u''$ meshing with the pinion. In order to guard against a sudden blow of the hammer possibly giving such momentum to the bifurcated arm as to rotate the pinion 27 more than desired, I provide as a break the spring-dog 36, pivoted to the case and arranged so that its lower end will be struck by the shoulder 37 on the hammer-lever, so as to throw the upper end of the dog between the teeth of the pinion just as the bifurcated arm has completed the transfer.

The above-described transfer mechanism, it will be understood, is applicable to any total-adding machine, and is not to be limited to the particular class of machines I have described, and forms a novel and very important part of my invention.

I will now describe the recording and time mechanism of my register. Hitherto it has been sought to arrange in connection with the key-levers of cash-registers a series of puncturing-pins or a series of type to record on paper strips or tickets the exact amount of each sum deposited in the register; but in those cash-registers with which I am familiar, containing registering and indicating mechanism and operated by keys, the puncturing points or type have been arranged to be operated by each key separately, so that with the puncturing-points prepared paper has had to be used, extending entirely across all the keys, or when type has been used it has only been applicable as a substitute for the puncturing-pins or to point on a ticket or check the amount of a single key only, for it will be manifest that if type are employed, each acted upon only by its corresponding key, it will not be practically useful in machines which employ two or three groups of keys to be operated simultaneously, for the type would in that case be correspondingly separated, and it would be impossible to have the check or ticket in two or three places at the same time to be printed. In my machine, however, I have connected the type-bar with the actuator for the registering mechanism, so that, through the medium of a bar common to each series of keys, I bring my type-bar into play by the operation of the several keys, each key in this way rotating the type-bar different degrees to bring the type denoting the value of the key into a position to be acted upon to stamp its value on the recording-paper; and, further, by this connection of the type-bar to the actuators I am enabled to bring together the type-bars of the series of actuators, so that I can print on a ticket or strip of paper in close proximity to each other, the record of the keys of each group operated simultaneously. This forms another novel and valuable feature of my invention, applicable as well to all machines employing actuators for the registry mechanism common to a group of keys as to the machine I have illustrated. Affixed to one side arm B' of each actuator and extending downward between the keys are the arms D'' D'' D'', each of which carries on its lower end a type-bar 38, holding a series of ten type, representing the numbers from 0 to 9, inclusive, as shown in Fig. 26, while the arms are so bent, as shown in Fig. 3, as to bring the type-bars in close proximity to each other, leaving sufficient space to allow for the lateral shifting of the actuator as the segment-rack is thrown into and out of mesh. In the normal position of the actuator the lowest type is the cipher, and the type are so spaced as to bring the other nine type in succession to the lowest point as the nine keys of the group are successively operated. When three keys, one for each group, are operated simultaneously, the type representing the numbers of the keys operated will be presented together at the lowest point of the type-bars. Extending across these type from side to side and wound on suitable rolls 41 41, supported in standards 42, is an ink-ribbon 43, while at right angles thereto and immediately underneath the same is the paper strip 45. This paper strip, in the form I have shown it, is paid out from a dispensing-roll E'' and wound upon a receiving roller or drum F''. Supported on proper supports at the left of the type-bars is a clock-movement G''. I need not further describe this movement than to say that I preferably use an ordinary eight-day clock, in which the minute-hand has been removed and a cam-wheel H'' has been substituted for the minute-hand, so that this cam-wheel will complete a revolution every hour. This wheel has two cams at opposite sides in order to give a reciprocating movement at intervals of half an hour to the pivoted pawl-carrier K'', the carrier being held by the spring 48, with the pin 49 bearing against the cam-wheel. This pawl-carrier carries the spring-dog 46, which engages with the ratchet-wheel L'', and it will be obvious from the construction shown that every half-hour the ratchet-wheel L'' will be moved one tooth, a spring-pawl 47, acting as a brake against any backward movement of the ratchet-wheel. Upon the ratchet-wheel L'', in front thereof, is secured the type-carrying disk M'', having extending from its outer surface a series of twenty-four type, representing each half-hour from six o'clock in the morning till six o'clock at night. This clock-movement with type-disk is so located with reference to the type-bars of the actuators as to bring an hour-type in close proximity to and in a line with the lowest type of the type-bars. Pivoted on a standard N'', secured to the bottom of the case, is a stamping-lever P'', carrying on one end a stamping-plate O'', of a length and width just sufficient to cover the four type that are in line at the lowest point. A spring 50, limited in its action by pins 59, underneath this stamping-lever presses against same on both sides of its pivotal point. Rigidly secured to the power-bar T' is a bar R'', pivoted on the key-shaft K and extending down between the keys. This bar R'' carries on its lower outer end a spring-dog S'', which catches under the outer end of the stamping-lever P'' and, upon the forward movement of the power-bar T', upon the operation of any key, raises and trips the stamping-lever in the well-known manner. Upon the tripping of the stamping-lever the stamping-plate O'' is thrown up under the action of spring 50 against the paper, ink-ribbon, and type, and thus prints upon the paper the time of the day and the amount deposited. The action of the spring 50 is such as to hold the stamping-lever in equilibrium, with the stamping-plate held slightly away from the recording-paper in its normal position; but when the lever is tripped the stamping-plate is thrown up, as described, the pins 59 acting to limit the vibration of the spring and bring the lever at once to rest. Secured to the power-bar T' in the same manner as bar R'' is another bar T'', likewise extending down between the operating-keys and carrying on its lower end a spring-pawl 51, which pawl engages with the ratchet-wheel U'' on the drum of the paper-receiving roll F'', so that with each operation of a key the drum F'' will be turned a part of a revolution, and thus a fresh portion of the paper will be exposed each time to the type, the tripping of the stamping-plate O'' not taking place until the key has reached the limit of its stroke and the paper strip has ceased to move under the action of pawl 51.

I have here shown the means for recording the half-hours of the business day on the recording-strip; but it is obvious that by increasing the number of cams on the cam-wheel and changing the type-disk accordingly the time-record may be changed every ten minutes, or even less, if desired. I have likewise arranged for the record-strip to be stored on a reel; but this method of disposing of the printed record is by no means necessary, as it may be arranged to be delivered out of the register and torn off or in other ways disposed of, and, furthermore, any convenient way of supporting the ink-ribbon may be used and means arranged to change the position of the ribbon also after each record.

The addition of my time movement to the recording registering mechanism forms another novel and valuable feature of my invention. It has become the custom in the use of cash-registers of this class to employ detectives to make purchases, in order to determine whether the cash-register is being honestly used, and large sums of money are spent every year for this purpose; but with my improvement the proprietor can be his own detective, as not only the amount but the time of each sale are recorded, so that if the proprietor knows that a purchase of seventy-five cents is made at, say, nine o'clock in the morning, upon examining the recording-strip at the end of the day's sales he can ascertain positively whether the proper amount was deposited in the register.

I am aware that it is old to combine a time-printing wheel with a cash-recording wheel in cash indicators and recorders; but in such machines, if registering mechanism is employed, two or more manual operations are necessary to effect a complete working of the machine, while in my machine the recording and time-printing mechanism is so combined with the registering mechanism that but a single operation of the numbered key is necessary to indicate, record, and register its value.

Having thus described my invention, what I claim, and desire to secure by Letters Patent, is—

1. In a cash register and indicator, the combination, with a series of keys of fixed values and a registering-wheel, of a pivoted operating-bar extending across said keys, with which the latter engage when operated, the distance between said operating-bar and the different keys being practically the same, but the engagement-surfaces being arranged of different lengths, and mechanism to connect said bar and registering-wheel, whereby the operation of any key causes its value to be registered on said registering-wheel, substantially as shown and described.

2. In a cash register and indicator, the combination, with a series of keys of fixed values and a registering-wheel, of a pivoted operating-bar extending horizontally across said keys, with which the latter engage when operated, the distance between said operating-bar and the different keys being practically the same, but the engagement-surfaces being arranged of different lengths, and mechanism to connect said bar and registering-wheel, whereby the operation of any key causes its value to be registered on said registering-wheel, substantially as shown and described.

3. In a cash register and indicator, the combination, with a series of keys of fixed values and a registering-wheel, of a series of indicating-tablets operated upon by said keys to indicate the value of the key operated, and a pivoted operating-bar extending across said keys, with which the latter engage when operated, the distance between said operating-bar and the different keys being practically the same, but the engagement-surfaces being arranged of different lengths, and mechanism to connect said bar and registering-wheel, whereby the operation of any key causes its value to be registered on said registering-wheel, substantially as shown and described.

4. In a cash register and indicator, the combination, with a series of keys of fixed values and a registering-wheel, of a series of indicating-tablets operated upon by said keys to indicate the value of the key operated, and a pivoted operating-bar extending horizontally across said keys, with which the latter engage when operated, the distance between said actuating-bar and the different keys being practically the same, but the engagement-surfaces being arranged of different lengths, and connecting mechanism between said bar and registering-wheel, whereby the operation of any key causes its value to be registered on the registering-wheel, substantially as shown and described.

5. In a cash register and indicator, the combination, with a series of keys of fixed values and a registering-wheel, of a pivoted operating-bar extending horizontally across said keys, a series of arms of substantially equal height but graded in length, one for each of said keys, and mechanism to connect said bar and registering-wheel, whereby the operation of any key causes its value to be registered on said registering-wheel, substantially as shown and described.

6. In a cash register and indicator, the combination, with a series of keys of fixed values and a registering-wheel, of an operating-bar extending across said keys, with which the latter engage when operated, and a stop-bar common to said keys and in connection with said operating-bar arranged to be brought into contact with the keys at the end of the desired movement of said operating-bar to stop said bar, the said keys being so cut and formed as to allow further operation of the keys, and mechanism to connect said operating-bar and the registry-wheel, whereby the operation of any key causes its value to be registered on the registry-wheel and thereafter said operating-bar to be positively stopped by the stop-bar from further movement during the subsequent operation of the key, substantially as shown and described.

7. In a cash register and indicator, the combination, with a series of keys of fixed values and a registering-wheel, of an operating-bar extending across said keys, with which the latter engage when operated, the distance between said operating-bar and the different keys being practically the same, but the engagement-surfaces being arranged of different lengths, a stop-bar common to said keys and, in connection with said operating-bar, arranged to be brought into contact with the keys at the end of the desired movement of said operating-bar to stop said bar, the said keys being so cut and formed as to allow further operation of the keys, and mechanism to connect said operating-bar and the registry-wheel, whereby the operation of any key causes its value to be registered on the registry-wheel and thereafter said operating-bar to be positively stopped by the stop-bar from further movement during the subsequent operation of the key, substantially as shown and described.

8. In a cash register and indicator, the combination, with a series of keys of fixed values and a registering-wheel, of an operating-bar extending horizontally across said keys, with which the latter engage when operated, the distance between said operating-bar and the different keys being practically the same, but the engagement-surfaces being arranged of different lengths, a stop-bar common to said keys and, in connection with said operating-bar, arranged to be brought into contact with the keys at the end of the desired movement of said operating-bar to stop said bar, the said keys being so cut and formed as to allow further operation of the keys, and mechanism to connect said operating-bar and the registering-wheel, whereby the operation of any key causes its value to be registered on the registry-wheel and thereafter said operating-bar to be positively stopped by the stop-bar from further movement during the subsequent operation of the key, substantially as shown and described.

9. In a cash register and indicator, the combination, with a series of keys of fixed values and a registering-wheel, of a series of indicating-tablets operated upon by said keys to indicate the value of the key operated, an operating-bar extending across said keys, with which the latter engage when operated, the distance between said operating-bar and the different keys being practically the same, the said keys being so cut and formed as to allow further operation of the keys, but the engagement-surfaces being arranged of different lengths, a stop-bar common to said keys and, in connection with said operating-bar, arranged to be brought into contact with the keys at the end of the desired movement of said operating-bar to stop said bar, and mechanism to connect said operating-bar and registering-wheel, whereby the operation of any key causes its value to be registered on the registry-wheel and thereafter said operating-bar to be positively stopped by the stop-bar from further movement during the subsequent operation of the key, substantially as shown and described.

10. In a cash register and indicator, the combination, with a series of keys of fixed values and a registering-wheel, of a series of indicating-tablets operated upon by said keys to indicate the value of the key operated, an operating-bar extending horizontally across said keys, with which the latter engage when operated, the distance between said operating-bar and the different keys being practically the same, but the engagement-surfaces being arranged of different lengths, a stop-bar common to said keys and, in connection with said operating-bar, arranged to be brought into contact with the keys at the end of the desired movement of said operating-bar to stop said bar, the said keys being so cut and formed as to allow further operation of the keys, and mechanism to connect said operating-bar and registering-wheel, whereby the operation of any key causes its value to be registered on the registry-wheel and thereafter said operating-bar to be positively stopped by the stop-bar from further movement during the subsequent operation of the key, substantially as shown and described.

11. In a cash register and indicator, the combination, with a series of keys of fixed values and a registering-wheel, of an operating-bar extending horizontally across the same, a series of arms of substantially equal height, but graded in length, one for each of said keys, a stop-bar common to said keys and, in connection with said operating-bar, arranged to be brought into contact with the keys at the end of the desired movement of said operating-bar to stop said bar, the said keys being so cut and formed as to allow further operation of the keys, and mechanism to connect said operating-bar and registering-wheel, whereby the operation of any key causes its value to be registered on the registry-wheel and thereafter said operating-bar to be positively stopped by the stop-bar from further movement during the subsequent operation of the key, substantially as shown and described.

12. In a cash register and indicator, the combination, with a series of keys of fixed values and a registering-wheel, of an actuator common to the series, provided with an operating and a stop side, and mechanism to connect said actuator and the registry-wheel, so that the operation of a key causes its value to be registered on the registry-wheel and thereupon said actuator to be positively stopped from further movement during the subsequent operation of the key, the said keys being so cut and formed as to allow said further operation, substantially as shown and described.

13. In a cash register and indicator, the combination, with a series of keys of fixed values and a registering-wheel, of an actuator common to the series, having a horizontally-disposed operating side and a stop side, and mechanism to connect said actuator and the registering-wheel, so that the operation of a key causes its value to be registered on the registry-wheel and thereupon said actuator to be positively stopped from further movement during the subsequent operation of the key, the said keys being so cut and formed as to allow said further operation, substantially as shown and described.

14. In a cash register and indicator, the combination, with a series of keys of fixed values and a registering-wheel, of an actuator common to the series, having a horizontally-disposed operating side and a horizontally-disposed stop side, and mechanism to connect said actuator and the registry-wheel, so that the operation of a key causes its valve to be registered on the registry-wheel and thereupon said actuator to be positively stopped from further movement during the subsequent operation of the key, the said keys being so cut and formed as to allow said further operation, substantially as shown and described.

15. In a cash register and indicator, the combination, with a series of keys of fixed values provided with a series of arms of substantially equal height but graded in length, and a registering-wheel, of an actuator having a horizontally-disposed operating and a horizontally-disposed stop side arranged at an angle to each other, and mechanism to connect said actuator and the registry-wheel, so that the operation of a key causes its value to be registered on the registry-wheel and thereupon said actuator to be positively stopped from further movement during the subsequent operation of the key, the said keys being so cut and formed as to allow said further operation, substantially as shown and described.

16. In a cash register and indicator, the combination, with a series of keys of fixed values provided with a series of arms of equal height but graded in length, a series of indicating-tablets operated upon by said keys to indicate the value of the key operated, and a registering-wheel, of an actuator having a horizontally-disposed operating and a horizontally-disposed stop side arranged at an angle to each other, and mechanism connecting said actuator and the registering-wheel, so that the operation of a key causes its value to be registered on the registry-wheel and thereupon said actuator to be positively stopped from further movement during the operation of the key, the said keys being so cut and formed as to allow said further operation, substantially as shown and described.

17. In a cash register and indicator, the combination, with a series of operating-keys, of an actuator extending across said keys and having an operating-bar to be engaged by the operated key, and also having a stop-bar to be brought against the key as the actuator is moved thereby and thus to stop the movement of the actuator during the subsequent operation of the key, the said keys being so cut and formed as to allow said further operation, substantially as shown and described.

18. In a cash register and indicator, the combination, with a series of operating-keys and a registering-wheel, of an actuator extending across said keys, pivoted to suitable supports and movable laterally thereon, with mechanism to connect said actuator with the registering-wheel, and means for shifting said actuator laterally upon the operation of a key, whereby the connecting mechanism is brought into operation to register the value of the key, substantially as shown and described.

19. In a cash register and indicator, the combination, with a series of operating-keys and a registering-wheel, of an actuator extending across said keys, pivoted to suitable supports and movable laterally thereon, with mechanism to connect said actuator with the registering-wheel, said actuator having an operating-bar, and a shifting-bar to be engaged by the operating-key, whereby the connecting mechanism is brought into operation to register the value of the key, substantially as shown and described.

20. In a cash register and indicator, the combination, with a series of operating-keys and a registering-wheel, of an actuator extending across said keys, pivoted to suitable supports and movable laterally thereon, with mechanism connecting said actuator with the registering-wheel, said actuator having an operating-bar to be engaged by the operated key, a stop-bar to be brought against the key as the actuator is moved thereby, and thus to stop the movement of the actuator during the subsequent operation of the key, and a shifting-bar to be likewise engaged by the operated key, whereby the connecting mechanism is brought into operation to register the value of the key, substantially as shown and described.

21. In a cash register and indicator, the combination, with a series of operating-keys and a registering-wheel, of an actuator extending across said keys, pivoted to suitable supports and movable laterally thereon, mechanism to connect said actuator with the registry-wheel, said actuator having an operating-bar and a shifting-bar arranged on opposite sides of the axis thereof, and arms on the keys to engage said bars, whereby the shifting of the actuator to bring the connecting mechanism into operation cannot in any way effect a registration, substantially as shown and described.

22. In a cash register and indicator, the combination, with a series of keys of fixed values having steps or graduated contact-surfaces and a registering-wheel, of an operating-bar extending across said keys, and mechanism to connect same with said registry-wheel, the contact-surfaces between said operating-bar and the different keys being arranged and graded as described, so that, commencing with the beginning of the stroke for each key, the operating-bar will be rocked the proper degree and thereafter the operating-bar will be held up by the key during the subsequent operation thereof, substantially as shown and described.

23. In a cash register and indicator, the combination, with a series of keys of fixed values, a registering-wheel, an operating-bar extending across said said keys, and mechanism to connect the two, of a series of steps on said keys graded longitudinally and having their back edges cut in the arc of a circle, whereby the operating-bar may be rocked the proper degree to register the value of the key and thereafter said bar be held up during the subsequent operation of the key, substantially as shown and described.

24. In a cash register and indicator, the combination, with a series of operating-keys, of two fixed receptacles for money, separated by the bank of operating-keys, sliding covers for said receptacles, and means whereby, upon the operation of a key, both of said receptacles will be opened simultaneously, substantially as shown and described.

25. In a cash register and indicator, the combination, with a series of operating-keys, of two fixed receptacles for money, separated by the bank of operating-keys, sliding covers therefor, and arms supporting said covers, with spring or equivalent means acting thereon, whereby said receptacles may be opened simultaneously, substantially as shown and described.

26. In a cash register and indicator, the combination, with a series of operating-keys, of two fixed receptacles for money, sliding covers therefor, and arms supporting said covers, each attached to a separate rock-shaft but in pivotal connection with each other, whereby the movement of one cover operates the other, substantially as shown and described.

27. In a cash register and indicator, the combination, with a series of operating-keys, of two fixed receptacles for money, sliding covers therefor, connected arms supporting said covers, with spring or equivalent means acting thereon, and latch released by the operation of any key to allow said receptacles to be opened simultaneously, substantially as shown and described.

28. In a cash register and indicator, the combination, with a series of operating-keys, of two fixed receptacles for money, sliding covers therefor, arms supporting said covers, each attached to a separate rock-shaft but in pivotal connection with each other, spring or equivalent means acting on said arms, and latch for said covers released by the operation of any key to allow said receptacles to be opened simultaneously, substantially as shown and described.

29. In a cash register and indicator, the combination, with two fixed receptacles for money, one above the other, and sliding covers therefor, of arms supporting said covers, each attached to a separate rock-shaft, said pairs of arms being of different lengths, and means for connecting said arms, whereby a differential rate of speed is obtained therein to allow said money-receptacles to be opened simultaneously, substantially as shown and described.

30. In a cash register and indicator, the combination, with a series of operating-keys, of two fixed receptacles for money, one above the other, sliding covers therefor, arms supporting said covers, each attached to a separate rock-shaft, said pairs of arms being of different lengths, slot-and-pin connection between the same, whereby a differential rate of speed is obtained, spring or equivalent means acting on said arms, and latch for said covers released by the operation of any key to allow said receptacles to be opened simultaneously, substantially as shown and described.

31. In a cash register and indicator, the combination, with a series of operating-keys, of a series of indicating-tablets mounted on a common axis and lying horizontally in alternate series to the front and rear of said axis and arranged to be rotated in opposite directions into a vertical position to indicate the value of the key operated, substantially as shown and described.

32. In a cash register and indicator, the combination, with a series of operating-keys, of a series of indicating-tablets mounted on a common axis and lying horizontally in alternate series to the front and rear of said axis, arranged to be rotated in opposite directions into a vertical position, each tablet provided with an arm, and a supporting-bar, with connecting mechanism, whereby upon the operation of any of the keys the bar is moved to permit the passage of the tablet-arm, and means for returning the bar to engage the tablet-arm and retain the tablet in a vertical position, substantially as shown and described.

33. In a cash register and indicator, the combination, with a series of indicating-tablets mounted on a common axis to rotate alternately in opposite directions into a vertical position, arms thereon, and a supporting-bar to engage said arms and retain the tablet in a vertical position, of springs or equivalent means to return said tablets to their normal position upon the release of said bar, substantially as shown and described.

34. In a cash register and indicator, the combination, with a series of indicating-tablets mounted on a common axis to rotate alternately in opposite directions into a vertical position, of a spring connecting each pair of tablets to draw them together on the supporting-shaft, substantially as shown and described.

35. In a cash register and indicator, the combination, with a series of vertically-reciprocating keys, of a shaft extending horizontally across the same, a series of indicating-tablets mounted thereon to lie horizontally in alternate series to the front and rear of said shaft, and a series of lifting-arms, one for each key, aranged in two sets to co-operate with the two sets of tablets and rotate them in opposite directions into a vertical position, substantially as shown and described.

36. In a cash register and indicator, the combination, with a series of vertically-reciprocating keys, of a shaft extending horizontally across the same, a series of indicating-tablets mounted thereon to lie horizontally in alternate series to the front and rear of said shaft, each tablet provided with an arm or lug, and a series of lifting-arms, one for each key, arranged in two sets to co-operate with the two sets of tablets and rotate them in opposite directions, and a supporting-bar, with connected mechanism, whereby upon the operation of any of the keys the bar is moved to permit the passage of the tablet-arm, and a spring or equivalent means for returning the bar to engage the tablet-arm and retain the tablet in a vertical position, substantially as shown and described.

37. In a cash register and indicator, the combination, with a series of operating-keys, of a series of indicating-tablets, each tablet provided with an arm or lug, a supporting-bar therefor, with a double-acting spring or its equivalent to vibrate the same, and bell-hammer rigidly attached thereto, with connecting mechanism between the bar and keys, whereby upon the operation of any of the keys the bar is moved to permit the passage of the tablet-arm and tripped under the action of said spring to simultaneously strike the gong and be returned to place to retain the operated tablet in a vertical position, substantially as shown and described.

38. In a cash register and indicator, the combination, with a series of operating-keys, of a series of rotating hubs mounted on a common axis, and tablets rigidly secured thereto alternately arranged on opposite sides of said axis, opposite beveled recesses in each pair of hubs, and a coiled spring encircling said shaft, with its ends engaging said beveled recesses to rotate the hubs and tablets in opposite directions and simultaneously to draw each pair of hubs together, substantially as shown and described.

39. In a cash register and indicator, the combination, with a series of operating-keys, of a series of indicating-tablets mounted on a common axis and lying horizontally in alternate series to the front and rear of said axis, arranged to be rotated in opposite directions into a vertical position, each tablet provided with an arm, and an oscillating frame consisting of an upper supporting-bar and a lower contact-bar, spring bearing against said frame to vibrate the same, and lugs on the keys to engage with said lower bar and trip the same, whereby upon the operation of any key the frame is shifted to permit the passage of the tablet-arm and subseqüently returned to catch and retain in a vertical position the tablet operated, substantially as shown and described.

40. In a cash register and indicator, the combination, with a series of operating-keys and a series of indicating-tablets operated thereby, of a supporting-bar to engage the operated tablets and retain same in a vertical position, bell-hammer attached rigidly thereto, and a double-acting vibrating spring operating on said bar to vibrate the same, with means to limit the action of said spring, whereby the signal-bell is struck simultaneously with the movement of said supporting-bar, substantially as shown and described.

41. In a cash register and indicator, the combination, with a series of operating-keys, of a series of indicating-tablets operated thereby, an oscillating frame consisting of an upper supporting-bar and a lower contact-bar, vibrating spring or equivalent means bearing against both bars of said frame, with pins or their equivalents to limit the action thereof, bell-hammer rigidly secured to one side of said frame, and lugs on the keys to engage with said lower bar, whereby upon the operation of any key the frame is shifted, so as to permit the passage of a tablet, and subsequently returned to catch and retain the tablet operated and simultaneously strike the signal-bell, substantially as shown and described.

42. In a cash register and indicator, the combination of a series of operating-keys, each provided with an arm carrying a rack rigidly secured to the keys, a pawl-bar extending across said keys, provided with a series of teeth, each to engage one of said racks, said pawl-bar being pivoted on suitable supports and movable laterally thereon, and means whereby upon the completion of the stroke of the operated key the pawl-bar may be shifted laterally to be disengaged from said racks and to allow the key to be reset, with spring or its equivalent for returning said pawl-bar to its normal position upon the resetting of the key, substantially as shown and described.

43. In a cash register and indicator, the combination of a series of operating-keys, each provided with an arm carrying a rack, a pawl-bar extending across said keys, provided with a series of teeth, each to engage one of said racks, said pawl-bar being pivoted on suitable supports and movable laterally thereon, beveled recesses on the rack-arms, and projections on the pawl-teeth, whereby upon the completion of the stroke of the operated key the pawl-bar may be shifted laterally to be disengaged from said racks and to allow the key to be reset, with spring for returning said pawl-bar to its normal position upon the resetting of the key, substantially as shown and described.

44. In a cash register and indicator, the combination, with a series of operating-keys arranged in groups, with mechanism to prevent the simultaneous operation of two or more keys of the same group, and a registering-wheel for each group, with means for actuating the same different degrees to register the values of the operated keys of each group, each key to be constructed so that the registration shall commence at the beginning of the stroke for all keys alike, of a key-coupler and a key-arrester common to the keys of all the groups, co-operating with each other, whereby the force required to operate the keys is the same for each key alike, and therefore the keys of the different groups may be operated initially in succession, substantially as shown and described.

45. In a cash register and indicator, the combination, with a series of operating-keys arranged in groups, with mechanism to prevent the simultaneous operation of two or more keys of the same group, and a registering-wheel for each group, with means for actuating the same different degrees to register the values of the operated keys of each group, each key to be constructed so that the registration shall commence at the beginning of the stroke for all keys alike, of a key-coupler consisting of a bar common to all the keys and slots in the keys to receive same, and a key-arrester co-operating therewith, whereby the force required to operate the keys is the same for each key alike, and therefore the keys of the different groups may be operated initially in succession, substantially as shown and described.

46. In a cash register and indicator, the combination, with a series of operating-keys arranged in groups and a registering-wheel for each group, with means for actuating the same different degrees to register the different values of the keys of each group, each key to be constructed so that the registration shall commence at the beginning of the stroke for all keys alike, of a key-coupler consisting of a pivoted bar common to all the keys and slots in the keys to receive same, and a key-arrester consisting of a series of pawl-bars common to the keys of each group and rack-teeth on the keys to receive same, said key-coupler and key-arrester co-operating with each other, whereby the force required to operate the keys is the same for each key alike, and therefore the keys of the different groups may be operated initially in succession, substantially as shown and described.

47. In a cash register and indicator, the combination, with a series of operating-keys, of a series of parts mounted in connection with each other, each part pivotally connected with a corresponding key, said parts arranged so as to permit the operation of one key at a time and to prevent the operation of two or more keys of the series simultaneously, substantially as shown and described.

48. In a cash register and indicator, the combination, with a series of operating-keys, of a series of hubs mounted in connection with each other, each hub pivotally connected with a corresponding key, said hubs being arranged so as to permit the operation of one hub at a time and therewith its corresponding key, but to prevent the operation or two or more hubs and their corresponding keys of the series simultaneously, substantially as shown and described.

49. In a cash register and indicator, the combination, with a series of operating-keys, of a series of interlocking hubs loosely mounted upon a common shaft, each hub pivotally connected with a corresponding key, said hubs being arranged so as to permit the operation of one hub at a time and therewith its corresponding key, but to interlock with each other to prevent the operation of two or more hubs and their corresponding keys of the series simultaneously, substantially as shown and described.

50. In a cash register and indicator, the combination, with a series of operating-keys, of a series of interlocking hubs loosely mounted upon a common shaft and movable longitudinally thereon, each hub pivotally connected with its corresponding key, said hubs having corresponding recesses and projections, so as to interlock with each other, but arranged to permit the operation of one hub at a time and therewith its corresponding key, but to interlock with each other to prevent the operation of two or more hubs and their corresponding keys of the series simultaneously, substantially as shown and described.

51. In a cash register and indicator, the combination, with a series of operating-keys, of a series of hubs loosely mounted upon a common shaft, said hubs being pivotally connected to their corresponding keys alternately on opposite sides of said common shaft and arranged so as to permit the operation of one hub at a time and therewith its corresponding key, but to prevent the operation of two or more hubs and their corresponding keys of the series simultaneously, substantially as shown and described.

52. In a cash register and indicator, the combination, with a series of operating-keys, of a series of interlocking hubs loosely mounted upon a common shaft and movable longitudinally thereon, said hubs being pivotally connected to their corresponding keys alternately on opposite sides of said common shaft and having corresponding recesses and projections, so as to interlock with each other, but arranged so as to permit the operation of one hub at a time and therewith its corresponding key, but to interlock with each other to prevent the operation of two or more hubs and their corresponding keys of the series simultaneously, substantially as shown and described.

53. In a cash register and indicator, the combination, with a series of operating-keys, of a series of interlocking hubs loosely mounted upon a common shaft and movable longitudinally thereon, arms and pins on said keys, and slotted arms on said hubs, so as to form a pivotal connection between each hub and its corresponding key, said pivotal points being arranged alternately on opposite sides of said common shaft, said hubs having corresponding recesses and projections, so as to interlock with each other, but arranged so as to permit the operation of one hub at a time and therewith its corresponding key, but to interlock with each other to prevent the operation of two or more hubs and their corresponding keys of the series simultaneously, substantially as shown and described.

54. In a cash register and indicator, the combination, with a series of operating-keys, of a series of interlocking hubs loosely mounted upon a common shaft and movable longitudinally thereon, each hub pivotally connected with a corresponding key, said hubs being arranged to be displaced longitudinally upon the operation of a single key to permit its operation and therewith its corresponding key, but interlocking two or more hubs and their corresponding keys when two or more keys are attempted to be moved simultaneously, substantially as shown and described.

55. In a cash register and indicator, the combination, with a registering-wheel and a series of keys for operating said wheel, of a series of interlocking hubs loosely mounted on a common shaft, each hub pivotally connected with its corresponding key, said hubs being arranged so as to permit the operation of one hub at a time and therewith its corresponding key, but to interlock with each other to prevent the operation of two or more hubs and their corresponding keys of the series simultaneously, substantially as shown and described.

56. In a cash register and indicator, the combination, with a registering-wheel and a series of keys for operating said wheel, of a series of interlocking hubs loosely mounted upon a common shaft and movable longitudinally thereon, each hub pivotally connected with its corresponding key, said hubs having corresponding recesses and projections, so as to interlock with each other, but arranged to permit the operation of one hub at a time and therewith its corresponding key, but to interlock with each other to prevent the operation of two or more hubs and their corresponding keys of the series simultaneously, substantially as shown and described.

57. In a cash register and indicator, the combination, with a registering-wheel and a series of keys for operating said wheel, of a series of hubs loosely mounted upon a common shaft, said hubs being pivotally connected to their corresponding keys alternately on opposite sides of said common shaft and arranged so as to permit the operation of one hub at a time and therewith its corresponding key, but to prevent the operation of two or more hubs and their corresponding keys of the series simultaneously, substantially as shown and described.

58. In a cash register and indicator, the combination, with a registering-wheel and a series of keys for operating said wheel, of a series of interlocking hubs loosely mounted upon a common shaft and movable longitudinally thereon, said hubs being pivotally connected to their corresponding keys alternately on opposite sides of said common shaft and having corresponding recesses and projections, so as to interlock with each other, but arranged to be displaced upon the operation of a single key to permit such operation and therewith its corresponding key, but interlocking two or more hubs and their corresponding keys of the series when two or more keys of the series are attempted to be moved simultaneously, substantially as shown and described.

59. In a cash register and indicator, the combination, with a series of registering-wheels and a series of groups of keys for operating said wheels, one group of keys for each wheel, of a series of sets of interlocking hubs loosely mounted upon a shaft, each hub pivotally connected with a corresponding key, said hubs being arranged so as to interlock with each other and prevent the operation of two or more keys of a group simultaneously, but to permit the simultaneous operation of two or more keys of different groups, substantially as shown and described.

60. In a cash register and indicator, the combination, with a series of registering-wheels and a series of groups of keys for operating said wheels, one group of keys for each wheel, of a series of sets of interlocking hubs loosely mounted upon a common shaft and movable longitudinally thereon, said hubs being pivotally connected to their corresponding keys alternately on opposite sides of said common shaft and having corresponding recesses and projections, so as to interlock with each other and prevent the operation of two or more keys of a group simultaneously, but to permit the simultaneous operation of two or more keys of different groups, substantially as shown and described 61. In a cash register and recorder, the combination, with a series of keys of fixed values having steps or graduated contact-surfaces and an actuator for the registering mechanism, actuated to different degrees by the contact-surfaces of the various keys to register the values thereof, of a type-bar carrying a series of type rigidly secured to said actuator, and a recording-paper to receive an imprint therefrom, whereby the movement of the actuator to register the value of the key automatically presents the proper type to record its value on the recording-paper, substantially as shown and described.

62. In a cash register and recorder, the combination, with a series of groups of keys of fixed values having steps or graduated contact-surfaces, and a series of actuators for the registry mechanism independent of each other, actuated to different degrees by the contact-surface of the various keys of the several groups to register the values thereof, and a recording-paper, of a series of type-bars in close proximity but independent of each other, one for each actuator, and carrying a series of type and rigidly secured to said actuators, whereby the movement of the actuators to register the value of the keys operates the type-bars to present simultaneously the type denoting the value of the keys operated to the recording-paper to be imprinted thereon, substantially as shown and described.

63. In a cash register and recorder, the combination, with a series of keys of fixed values and an actuator for the registering mechanism, actuated to different degrees by the various keys to register the values thereof, of two independent type-carriers and series of type thereon, a clock automatically moving one of the type-carriers to record the time and the other rigidly secured to said actuator, and a recording-paper to receive an imprint from both sets of type, whereby the movement of the actuator to register the value of the key and the movement of the clock automatically present the proper type to record the value of the key and the time of the operation, substantially as shown and described.

64. In a cash register and recorder, the combination, with a series of groups of keys of fixed values and a series of actuators for the registry mechanism independent of each other, actuated to different degrees by the various keys of the several groups to register the value thereof, of a series of type-bars in close proximity but independent of each other, one for each actuator, and secured rigidly thereto, a type-carrying wheel, and a clock automatically moving the same to record the time, and a recording-paper to receive an imprint from all the sets of type, and thus to simultaneously record the values of the keys of the different groups when they are operated simultaneously and the time of their operation, substantially as shown and described.

65. In a cash register and recorder, the combination, with a series of keys and an actuator for the registering mechanism, of a type-bar carrying a series of type, operated by said actuator to present upon the operation of a key the type denoting the value of said key, a pivoted stamping lever and plate, tripping mechanism and bar common to all the keys for actuating the same, and a recording-paper with inking-ribbon extending across said type, whereby upon the operation of any key said stamping lever and plate are tripped against said type to record the value thereof on the recording-paper, substantially as shown and described.

66. In a cash register and recorder, the combination, with a series of groups of keys of fixed values and a series of actuators for the registry mechanism independent of each other, of a series of type-bars, one for each actuator, in close proximity but independent of each other, and each carrying a series of type operated by said actuators to present simultaneously the type denoting the values of the keys of each group operated, a pivoted stamping lever and plate, tripping mechanism and bar common to all the keys for actuating the same, and a recording-paper with inking-ribbon extending across all of said type, whereby upon the simultaneous operation of keys of the different groups said stamping lever and plate are tripped against all of said type to record the total value of said keys on the recording-paper, substantially as shown and described.

67. In a cash register and recorder, the combination, with a series of keys of fixed values and an actuator for the registering mechanism, actuated to different degrees by the various keys to register the values thereof, of two independent type-carriers and series of type thereon, a clock automatically moving one of the type-carriers to record the time, and said actuator operating the other to present the type denoting the value of the key, a pivoted stamping lever and plate, tripping mechanism and bar common to all the keys for actuating the same, and a recording-paper with inking-ribbon extending across both of said type, whereby upon the operation of any key said stamping lever and plate are tripped against both said type to record the value of said key and the time of its operation, substantially as shown and described.

68. In a cash register and recorder, the combination, with a series of groups of keys of fixed values and a series of actuators for the registering mechanism independent of each other, actuated to different degrees by the various keys of the several groups to register the values thereof, of a series of type-bars in close proximity but independent of each other, one for each actuator, and each carrying a series of type operated by said actuators to present simultaneously the type denoting the value of the keys, a type-carrying wheel and a clock automatically moving the same to record the time, a pivoted stamping lever and plate, tripping mechanism and bar common to the keys of all the groups for actuating the same, and a recording-paper with inking-ribbon extending across all of said type, whereby upon the simultaneous operation of keys of the different groups said stamping lever and plate are tripped against all of said type to record the total value of said keys and the time of their operation, substantially as shown and described.

69. In a cash register and recorder, the combination, with two independent type-carriers, a clock automatically moving one, an actuator for the registry mechanism rigidly secured to and moving the other, a recording-strip of paper extending across the type wound on a receiving-roll, with driving mechanism therefor, and a pivoted stamping lever and plate for printing the same, and tripping mechanism therefor, of a pivoted bar extending across all the keys to be actuated thereby, and connecting-arms between said bar, the driving mechanism of the roll of paper, and the tripping mechanism of the stamping-lever, whereby the operation of the key sets the proper type for the record and in succession presents fresh recording-paper and trips the stamping mechanism to print the same, substantially as shown and described.

70. In a cash register and recorder, the combination, with a series of operating-keys and a series of type actuated thereby to present the proper type for record, with a recording-paper and inking-ribbon, of a pivoted stamping-lever, with stamping-plate, and a spring or equivalent means acting on the opposite sides of the pivotal point of said stamping-lever, with pins or their equivalent to limit the action of said lever and tripping mechanism therefor, whereby said lever is normally held away from said paper and inking-ribbon, but upon the tripping thereof throws the paper and ribbon against said type to receive an imprint therefrom, substantially as shown and described.

71. In a cash-register of the class described, the combination, with a series of three groups of keys representing denominations of successively-higher grades and a series of registry-wheels corresponding thereto and operated thereby, of means for accumulating the amounts registered on the wheel of lowest denomination, and transfer mechanism in connection therewith, whereby the transfer may be made directly from the accumulations of the wheel of the lowest denomination to the wheel of highest denomination, substantially as shown and described.

72. In a cash-register of the class described, the combination, with a series of three groups of keys representing denominations of successively-higher grades and a series of registry-wheels corresponding thereto and operated thereby, of a supplemental registering-wheel similar to the wheel of the second denomination to receive the accumulations of the wheel of lowest denomination, and transfer mechanism to transfer amounts from said supplemental wheel directly to the wheel of highest denomination, substantially as shown and described.

73. In a cash-register of the class described, the combination, with a series of three groups of keys representing denominations of successively-higher grades and a series of registry-wheels corresponding thereto and operated thereby, of separate transfer-pawls for the wheels of lower denomination set for the transfer by said wheels independently, means to connect same with the registering-wheel of highest denomination, and mechanism for completing the transfer upon the subsequent operation of the keys, substantially as shown and described.

74. In a cash-register of the class described, the combination, with a series of three groups of keys representing denominations of successively-higher grades and a series of registering-wheels corresponding thereto and operated thereby, of a supplemental registering-wheel, similar to the wheel of the second denomination, to receive the accumulations of the wheel of lowest denomination, separate transfer-pawls for the supplemental wheel and the wheel of middle denomination set for the transfer by said wheels independently, means to connect same with the registering-wheel of the highest denomination, and mechanism for completing the transfer upon the subsequent operation of the keys, substantially as shown and described.

75. The combination, in a total-adding machine, with a series of groups of keys and primary units, tens, and hundreds registering wheels, with a supplemental tens-wheel to receive the transfer of units from the units-wheel, a transferring lever or bar, and means whereby same is uniformly operated by the action of the keys, of two transfer-pawls set by the tens primary and supplemental wheels, and mechanism connecting same with the primary hundreds-wheel, whereby said transferring-lever, acting on said pawls, completes the transfer from either of said tens-wheels, substantially as shown and described.

76. The combination, in a total-adding machine, with a series of groups of keys and primary units, tens, and hundreds registering wheels, with a supplemental tens-wheel to receive the transfers of units from the units-wheel, a transferring lever or bar, and means whereby same is uniformily operated by the action of the keys, of two transfer-pawls set by the tens primary and supplemental wheels, with additional pawl hinged to one of said pawls, and means for locking same to the other pawl when both pawls are set simultaneously, together with mechanism to connect said transfer-pawls to the hundreds-wheel, whereby said transferring-lever, when both said pawls are set simultaneously, acting thereon, completes the transfer from both said registering-wheels in one operation, substantially as shown and described.

77. The combination, in a total-adding machine, with a series of primary registering-wheels representing units, tens, and hundreds, and a supplemental tens-wheel to receive the units transferred from the units-wheel, of a pivoted bifurcated pawl-carrying and transfer arm, two separate transfer-pawls pivoted in the one fork thereof, one acted on by the primary tens-wheel, the other by the supplemental tens-wheel to set the same for transfer, means attached to said other fork for actuating the dollars-registering wheel, and a transferring-lever to strike said transfer-pawls when set and thus to complete the transfer, substantially as shown and described.

78. The combination, in a total-adding machine, with a series of primary registering-wheels representing units, tens, and hundreds, and a supplemental tens-wheel to receive the units transferred from the units-wheel, of a pivoted bifurcated pawl-carrying and transfer arm, means for actuating the dollars-registry wheel attached to one fork of said arm, two independent transfer-pawls pivoted in the other fork, one acted on by the primary tens-wheel and the other by the supplemental tens-wheel to set the same for transfer, an intermediary pawl pivoted to one of said transfer-pawls with pin to lock same to the other pawl when both are set simultaneously, and transferring-lever to strike said pawls thus locked and complete a double transfer, substantially as shown and described.

79. The combination, in a total-adding machine, with a series of primary registering-wheels representing units, tens, and hundreds, and a supplemental tens-wheel to receive the units transferred from the units-wheel, of a loosely-pivoted bifurcated pawl-carrying and transfer arm, rack attached to one fork thereof, pinion on the dollars-registering wheel to be engaged thereby, with two transfer-pawls pivoted to the other fork, one acted on by the tens primary wheel, the other by the tens supplemental wheel to set same for transfer, and means for automatically shifting said bifurcated arm inwardly to bring said rack and pinion in line during the operation thereof, with springs or their equivalents to return same to place and thus to release the dollars-wheel, substantially as shown and described.

80. In a cash register and indicator, the combination, with a series of operating-keys, of a pivoted bar extending across said keys and resting thereon, with lever for the transferring mechanism connected to said pivoted bar, spring bearing against the same, and transfer-hammer acted on by said lever, whereby the operation of any of the keys places said spring under tension to cause said lever to raise said hammer upon the return stroke of the operated key, substantially as shown and described.

81. The combination, in the transfer mechanism of a total-adding machine, of a loosely-pivoted pawl-carrier, spring acting thereon, two independent transfer-pawls pivoted thereto, an arm attached to said pawl-carrier, with transferring-lever for the transfer mechanism in connection therewith, and lugs or projections on the casing, whereby on the operation of said transferring-lever said pawl-carrier is shifted inwardly and upon the release thereof said pawls, when set for transfer, are brought into contact with said projections of the case to be returned to place, substantially as shown and described.

82. In a cash register and indicator, the combination, with a series of keys of fixed values, a registering-wheel, and actuator having an operating-bar and a stop-bar, of a series of steps on said keys graded longitudinally and having their back edges cut in the arc of a circle, whereby the operating-bar may be rocked the proper degree to register the value of the key and thereafter said bar be held up thereby and simultaneously said stop-bar be brought into contact with said key to prevent farther movement of the actuator in either direction during the subsequent operation of the key, substantially as shown and described.

PHILIP YOE.

Witnesses:
JOHN KIRBY, Jr.,
C. U. RAYMOND.